US011333372B2

(12) United States Patent
Duncan

(10) Patent No.: US 11,333,372 B2
(45) Date of Patent: May 17, 2022

(54) ENERGY RECOVERY HIGH EFFICIENCY DEHUMIDIFICATION SYSTEM

(71) Applicant: Scot Matthew Duncan, Laguna Hills, CA (US)

(72) Inventor: Scot Matthew Duncan, Laguna Hills, CA (US)

( * ) Notice: Subject to any disclaimer, the term of this patent is extended or adjusted under 35 U.S.C. 154(b) by 82 days.

(21) Appl. No.: 16/233,800

(22) Filed: Dec. 27, 2018

(65) Prior Publication Data

US 2019/0277515 A1 Sep. 12, 2019

Related U.S. Application Data

(60) Provisional application No. 62/641,211, filed on Mar. 9, 2018, provisional application No. 62/641,200, filed on Mar. 9, 2018.

(51) Int. Cl.
*F24F 3/153* (2006.01)
*F24F 3/16* (2021.01)
(Continued)

(52) U.S. Cl.
CPC ............... *F24F 3/153* (2013.01); *F24F 8/10* (2021.01); *F24F 13/1413* (2013.01); *F24F 13/15* (2013.01); *F24F 8/22* (2021.01)

(58) Field of Classification Search
CPC ...... F24F 13/15; F24F 3/1603; F24F 13/1413; F24F 3/153; F24F 2003/1667;
(Continued)

(56) References Cited

U.S. PATENT DOCUMENTS 2,928,260 A 3/1930 Blum
2,160,389 A 5/1939 Palmer
(Continued)

FOREIGN PATENT DOCUMENTS

| CN | 101849151 A | 9/2010 |
|---|---|---|
| CN | 101849151 B | 5/2013 |
| EP | 1335166 A2 | 6/2003 |
| EP | 1135166 A3 | 12/2003 |
| EP | 1426703 A | 6/2004 |
| EP | 1429083 A | 6/2004 |

(Continued)

OTHER PUBLICATIONS

"International Search Report" and "Written Opinion of the International Searching Authority," Patent Cooperation Treaty Application No. PCT/US2019/018623, dated May 10, 2019, 8 pages.
(Continued)

*Primary Examiner* — Frantz F Jules
*Assistant Examiner* — Martha Tadesse
(74) *Attorney, Agent, or Firm* — Carr & Ferrell LLP

(57) ABSTRACT

Disclosed herein are systems and methods for providing hot air or hot dehumidified air to a facility using an energy recovery high efficiency dehumidification system. The energy recovery high efficiency dehumidification system can include an air filter bank that receives air from a first inlet source, a supply fan that causes the air to flow from the first inlet source, a cooling coil configured to cool and reduce a relative humidity of the air that passes over the cooling coil, a cooling recovery coil coupled with the cooling coil and configured to heat the cooled air to generate cooled dehumidified reheated air in a cooling recovery coil plenum, an equipment room configured to surround mechanical and electrical equipment and further heat received cooled dehumidified reheated air, and a heat rejection coil that rejects heat from one or more components of the mechanical and electrical equipment to further heat the air.

16 Claims, 12 Drawing Sheets

(51) Int. Cl.
*F24F 13/15* (2006.01)
*F24F 13/14* (2006.01)
*F24F 8/10* (2021.01)
*F24F 8/22* (2021.01)

(58) Field of Classification Search
CPC ............ F24F 2003/1452; F24F 3/1405; F24F 2110/52; F24F 3/147
See application file for complete search history.

(56) References Cited

U.S. PATENT DOCUMENTS

| | | | |
|---|---|---|---|
| 2,200,118 A | 5/1940 | Miller | |
| 2,286,604 A | 6/1942 | Crawford | |
| 2,299,531 A | 10/1942 | Crawford | |
| 2,515,825 A | 7/1950 | Grant | |
| 3,625,022 A | 12/1971 | Johnson | |
| 3,921,413 A * | 11/1975 | Kohlbeck | F24F 3/153 62/173 |
| 4,270,363 A | 6/1981 | Maring | |
| 4,271,678 A | 6/1981 | Liebert | |
| 4,380,910 A | 4/1983 | Hood | |
| 4,407,134 A | 10/1983 | Snaper | |
| 4,427,055 A | 1/1984 | Heavener | |
| 4,559,788 A | 12/1985 | McFarlan | |
| 4,642,992 A | 2/1987 | Julovich | |
| 4,667,479 A | 5/1987 | Doctor | |
| 4,920,756 A | 5/1990 | Howland | |
| 4,942,740 A | 7/1990 | Shaw | |
| 5,031,411 A | 7/1991 | Gehring | |
| 5,142,396 A | 8/1992 | Divjak | |
| 5,193,352 A | 3/1993 | Smith | |
| 5,337,577 A | 8/1994 | Elemann | |
| 5,390,206 A | 2/1995 | Rein | |
| 5,390,505 A | 2/1995 | Smith | |
| 5,435,147 A | 7/1995 | Mochizuki | |
| 5,540,058 A | 7/1996 | Yi | |
| 5,607,011 A | 3/1997 | Abdelmalek | |
| 5,613,372 A | 3/1997 | Beal | |
| 5,640,153 A | 6/1997 | Hildebrand | |
| 5,682,754 A | 11/1997 | Groenewold | |
| 5,816,066 A | 10/1998 | Aoki | |
| 5,909,378 A | 6/1999 | De Milleville | |
| 5,953,926 A | 9/1999 | Dressler | |
| 6,055,818 A | 5/2000 | Valle et al. | |
| 6,115,713 A | 9/2000 | Pascucci | |
| 6,227,961 B1 | 5/2001 | Moore | |
| 6,260,366 B1 | 7/2001 | Pan | |
| 6,269,650 B1 | 8/2001 | Shaw | |
| 6,286,764 B1 | 9/2001 | Garvey | |
| 6,645,016 B1 | 11/2003 | Andersen | |
| 6,666,040 B1 | 12/2003 | Groenewold et al. | |
| 6,694,757 B1 | 2/2004 | Backman | |
| 6,826,921 B1 | 12/2004 | Uselton | |
| 6,976,365 B2 | 12/2005 | Forkosh | |
| 7,216,698 B2 | 5/2007 | Catzel | |
| 7,219,505 B2 | 5/2007 | Weber | |
| 7,890,215 B2 | 2/2011 | Duncan | |
| 8,151,579 B2 | 4/2012 | Duncan | |
| 8,406,929 B2 | 3/2013 | Duncan | |
| 8,408,015 B2 | 4/2013 | Duncan | |
| 8,534,346 B1 | 9/2013 | Mecozzi | |
| D748,319 S | 1/2016 | Johnson et al. | |
| D748,320 S | 1/2016 | Johnson et al. | |
| D748,847 S | 2/2016 | Johnson et al. | |
| D748,850 S | 2/2016 | Johnson et al. | |
| 9,638,472 B2 | 5/2017 | Duncan | |
| 9,681,515 B2 | 6/2017 | Rantala | |
| D794,842 S | 8/2017 | Keen et al. | |
| 10,935,262 B2 | 3/2021 | Duncan | |
| 11,073,296 B2 | 7/2021 | Duncan | |
| 2002/0173929 A1 | 11/2002 | Seigel | |
| 2003/0061822 A1 | 4/2003 | Rafalovich | |
| 2003/0192328 A1 | 10/2003 | Kikuchi | |
| 2004/0044502 A1 | 3/2004 | Ito | |
| 2004/0065099 A1 | 4/2004 | Gramov | |
| 2005/0038567 A1 | 2/2005 | Maeda | |
| 2005/0097905 A1 | 5/2005 | Kwon | |
| 2005/0262865 A1 | 12/2005 | Yabutani | |
| 2006/0218949 A1 | 10/2006 | Ellis | |
| 2007/0277955 A1 * | 12/2007 | Kaiser | F24H 3/06 165/45 |
| 2008/0033599 A1 | 2/2008 | Aminpour | |
| 2008/0104974 A1 | 5/2008 | Dieckmann et al. | |
| 2009/0050703 A1 | 2/2009 | Lifson | |
| 2009/0064692 A1 * | 3/2009 | Duncan | F28F 1/00 62/93 |
| 2009/0171512 A1 | 7/2009 | Duncan | |
| 2010/0057263 A1 | 3/2010 | Tutunoglu | |
| 2011/0096503 A1 * | 4/2011 | Avery | F25B 27/02 361/701 |
| 2011/0137468 A1 | 6/2011 | Duncan | |
| 2012/0125019 A1 | 5/2012 | Sami | |
| 2012/0152494 A1 | 6/2012 | Duncan | |
| 2013/0125574 A1 * | 5/2013 | Uselton | F24F 13/30 62/264 |
| 2013/0167564 A1 | 7/2013 | Burg et al. | |
| 2013/0171031 A1 | 7/2013 | Garfield et al. | |
| 2013/0213608 A1 | 8/2013 | Duncan | |
| 2014/0048244 A1 | 2/2014 | Wallace | |
| 2014/0260367 A1 * | 9/2014 | Coutu | F24F 3/147 62/89 |
| 2015/0204586 A1 | 7/2015 | Burg et al. | |
| 2015/0204591 A1 | 7/2015 | Burg et al. | |
| 2015/0233626 A1 | 8/2015 | Keen | |
| 2016/0010899 A1 | 1/2016 | Johnson | |
| 2016/0061473 A1 | 3/2016 | Johnson, Jr. | |
| 2016/0195293 A1 | 7/2016 | Schmitt et al. | |
| 2017/0142910 A1 | 5/2017 | Johnson et al. | |
| 2017/0219224 A1 | 8/2017 | Duncan | |
| 2017/0370366 A1 | 12/2017 | Johnson et al. | |
| 2017/0370570 A1 | 12/2017 | Keen et al. | |
| 2019/0277516 A1 | 9/2019 | Duncan | |
| 2021/0285666 A1 | 9/2021 | Duncan | |

FOREIGN PATENT DOCUMENTS

| | | |
|---|---|---|
| EP | 1437558 A1 | 7/2004 |
| GB | 2258743 A | 2/1993 |
| JP | S59200140 A | 11/1984 |
| JP | S6176232 U | 5/1986 |
| JP | S6189763 U | 6/1986 |
| JP | S63279035 A | 11/1988 |
| JP | H07233968 A | 9/1995 |
| JP | H09287797 A | 11/1997 |
| JP | 2002061903 A | 2/2002 |
| JP | 2004012016 A | 1/2004 |
| JP | 2005069552 A | 3/2005 |
| JP | 2005207712 A | 8/2005 |
| JP | 2005211742 A | 8/2005 |
| JP | 2006177567 | 7/2006 |
| JP | 2006207856 A | 8/2006 |
| JP | 2006292299 A | 10/2006 |
| JP | 2007064556 | 3/2007 |
| JP | 20150539427 A | 12/2010 |
| JP | 5612472 B2 | 10/2014 |
| JP | 2015028419 A | 2/2015 |
| JP | 2017072364 A | 4/2017 |
| JP | 6559640 B2 | 8/2019 |
| JP | 2019174112 A | 10/2019 |
| WO | WO2006019909 A1 | 2/2006 |
| WO | WO2008079829 | 7/2008 |
| WO | WO2009033097 A9 | 3/2009 |
| WO | WO2019173046 A1 | 9/2019 |
| WO | WO2019173047 A1 | 9/2019 |

OTHER PUBLICATIONS

"International Search Report" and "Written Opinion of the International Searching Authority," Patent Cooperation Treaty Application No. PCT/US2019/018630, dated May 23, 2019, 9 pages.

(56) References Cited

OTHER PUBLICATIONS

"Office Action", Japan Patent Application No. 2010524203, dated Nov. 16, 2013, 10 pages.
"International Search Report" and "Written Opinion of the International Searching Authority," Patent Cooperation Treaty Application No. PCT/US2008/075491, dated Nov. 19, 2008, 5 pages.
"International Search Report" and "Written Opinion of the International Searching Authority," Patent Cooperation Treaty Application No. PCT/US2007/088007, dated Jul. 17, 2008, 13 pages.

* cited by examiner

ENERGY RECOVERY HIGH EFFICIENCY DEHUMIDIFICATION SYSTEM

CROSS-REFERENCE TO RELATED APPLICATIONS

This application claims the benefit of U.S. Provisional Application No. 62/641,200, filed Mar. 9, 2018, and U.S. Provisional Application No. 62/641,211, filed Mar. 9, 2018, the disclosures of which is hereby incorporated by reference. This application is also related to U.S. application Ser. No. 16/234,023, filed Dec. 27, 2018. The disclosures of the above-reference applications are hereby incorporated by reference in their entirety for all purposes.

TECHNICAL FIELD

The present subject matter pertains to climate control systems. In particular, but not by way of limitation, the present subject matter provides for energy efficient climate control systems.

BACKGROUND OF THE INVENTION

Existing coil and dehumidification unit designs commonly implemented for cooling, dehumidification and reheat duties have a number of drawbacks.

Common problems created by industry standard cooling coil, cooling unit, cooling systems, and HVAC designs include, but are not limited to: high airside pressure drop; excessive cooling coil vertical height that creates a condensate "stacking" effect; inadequate numbers of coil rows can create a condensate stacking effect; inadequate and poorly designed cooling coil drain pans; excessive air velocity across the coil sections during deep dehumidification duties; excessive liquid water (condensate) being carried off of the coil into the unit and downstream ductwork; condensate carry-off being re-evaporated into the airstream; condensate being carried off and re-evaporated off of the cooling coil and drain pan systems due to compressor cycling on and off; condensate being carried off and re-evaporated off of the cooling coil and drain pan systems due to temperature swings; inability to unload far enough to provide proper temperature and relative humidity (RH) control when loads are light; energy waste, excessive water, and chemical consumption; excessive energy rejection to, or withdrawal from, ground coupled HVAC systems; undersized ductwork and air distribution terminal units; and other common system design and operational problems, as described in more detail herein.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Various embodiments of the present subject matter provide for an Energy Recovery High Efficiency Dehumidification System (ERHEDS) and in some instances, a one-hundred-percent Energy Recovery High Efficiency Dehumidification System (100% ERHEDS). With the ERHEDS, mold growth can be eliminated, and climate control can be provided with the use of fewer resources. That is, the system provides for reduced life cycle cost (in energy usage, water usage and maintenance), it is easy to configure and scale, and provides more reliable/resilient systems for controlling the climate within an enclosed facility. The ERHEDS system can be utilized in facilities that are unoccupied, or in need of rapid dehumidification. In some embodiments, the ERHEDS can transition functions and be utilized to control the conditions in occupied facilities such as ships, residential homes, military barracks, commercial, industrial and institutional facilities, Municipal, University, State and Hospital facilities, clean rooms, laboratories, and even greenhouses for plant material such as *cannabis* grow houses.

In some aspects, an energy recovery high efficiency dehumidification system for providing hot air or hot dehumidified air to a facility can include an air filter bank, a supply fan, a preheat coil, a cooling coil, a chemical or biological mitigation system, a cooling recovery coil, an equipment room, and/or a heat rejection coil, and/or the like. The air filter bank can receive air from a first inlet source. The supply fan can cause the air to flow from the first inlet source. The cooling coil can cool and reduce a relative humidity of the air that passes over the cooling coil. The cooling recovery coil can be coupled with the cooling coil and can heat the cooled air to generate cooled dehumidified reheated air in a cooling recovery coil plenum. The equipment room can surround mechanical and electrical equipment and receive the cooled dehumidified reheated air from the cooling recovery coil plenum. The cooled dehumidified reheated air is configured to be further heated. The heat rejection coil that rejects heat recovered from one or more components of the mechanical and electrical equipment and cooling equipment can cause a temperature of the further heated cooled dehumidified reheated air to increase. The air can pass through an outlet to other HVAC equipment, or to the facility or process load.

In some aspects, an energy recovery high efficiency dehumidification system for providing cool dehumidified air to a facility can include an air filter bank, a supply fan, a preheat coil, a cooling coil, a chemical or biological mitigation system, a cooling recovery coil, a first outlet, an equipment room and/or a heat rejection coil, among other components. The air filter bank can receive outside air from an environment via a first inlet source. The supply fan can cause the air to flow from the first inlet source. The cooling coil can cool and reduce the moisture content of the air that passes over the cooling coil. The cooling recovery coil can be coupled with the cooling coil and configured to heat the cooled air to generate cooled dehumidified reheated air in a cooling recovery coil plenum. The first outlet can be coupled with ductwork to allow the cooled dehumidified reheated air to pass to a facility. The equipment room can surround mechanical and electrical equipment and receive outside air from an environment via a second inlet source. The outside air entering the equipment room can be heated. The heat rejection coil can reject heat recovered from one or more components of the mechanical and electrical equipment and cooling equipment to cause a temperature of the heated outside air to increase. The heated outside air can pass through an outlet to the environment.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1A:
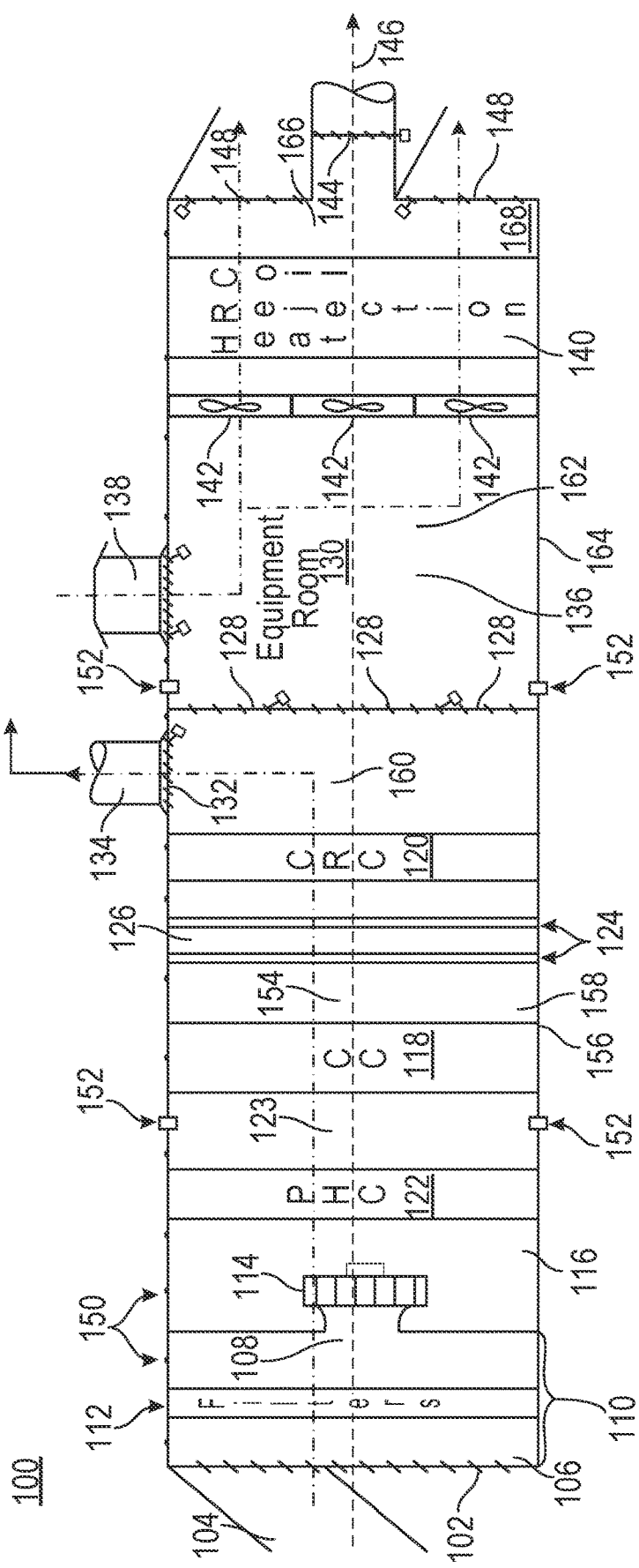
FIG. 1A is a schematic diagram of an exemplary climate control system that can be used to practice aspects of the present subject matter.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present subject matter. As such, some of the components may have been distorted from their actual scale for pictorial clarity.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

The present technology provides an energy recovery high efficiency dehumidification system (ERHEDS) and method of operating the same. In some implementations, the ERHEDS is a one-hundred-percent energy recovery high efficiency dehumidification system. The ERHEDS and physical implementations can include a variety of equipment, such as fans, fluid-conveying coils, tubing and piping, heat transfer coils, vents, louvers, dampers, valves, actuators, fluid chillers, fluid heaters, and/or the like. Any of the implementations described herein can also include controls and logic, responsive to one or more sensors or other input devices, for controlling the equipment for each implementation described herein. The term "water," or "fluid" as used herein, broadly describes a liquid-based heat rejection or heat transfer system. The term "air handling unit" or "fan coil unit" broadly describes equipment that is designed to provide temperature and relative humidity control to meet space conditioning and process needs. The term "plenum" broadly describes a space that can facilitate air circulation.

Energy recovery options are shown on some implementations, but are not shown on others. One skilled in the art would understand that similar heat recovery opportunities are available from each of the implementations described herein.

While sequences of operation and software to control each implementation are generally described, one or more implementations can include software that implement algorithms and strategies that are self-tuning, self-learning, anti-equipment cycling, and are set up to make the ERHEDS design renewable energy and energy storage friendly, including software that allows the ERHEDS system to be utilized as a Distributed Energy Resource, while still maintaining the relative humidity needs of the space.

The present subject matter relates generally to air conditioning in a facility, and more particularly to cooling, dehumidification, and heating systems and processes to reduce energy waste and reduce operating costs in facilities. For example, the systems described herein can be used in any type of facility, such as in facilities that are vacant and/or unoccupied for a period of time and then later reoccupied, and/or a facility with a leaky façade, among other facilities.

In some instances, the environment of the facility, such as a residential, commercial, industrial, or institutional building, is tightly controlled, as temperature and humidity must fall within a relatively narrow range to accommodate human comfort, health, and safety. Similarly, in some instances, temperature and humidity must fall within a relatively narrow range to accommodate the needs of laboratories and manufacturing and clean room facilities. Poor relative humidity (RH) control, mold, mildew, and other biological growth can cause corrosion, extensive damage to a facility, and adverse effects on its occupants, processes, and products. Biological growth particularly thrives in warm, moist areas. To reduce the potential for biological growth and other damage to facilities, processes or loads, facilities need to reduce the relative humidity of air within the facility. Thus, water is removed from the air in a process called dehumidification.

In various instances, conventional methods for humidity and temperature control in a facility are energy intensive, overly complicated, and maintenance-prone, leading to high costs of operation of its cooling, dehumidification, and heating systems. Economizing either costs or energy often leads to improper use of such systems, defeating their purpose. Worse, misuse of cooling, dehumidification, and heating systems permits biological growth. In humid climates, for example, cooling systems may be left running twenty-four hours per day, seven days per week to reduce the potential for biological growth, even when the facility is unoccupied. This wastes substantial energy and causes undue equipment wear and premature failures, increasing maintenance and lifecycle costs.

A plenum space can be a part of a building or a piece of equipment that can facilitate air circulation for heating and air conditioning systems, by providing pathways for either heated/conditioned or return airflows, usually, but not always, at greater than atmospheric pressure. For example, space between the structural ceiling and the dropped ceiling or under a raised floor is typically considered plenum space. Similarly, an area between components of an HVAC unit can also be considered to be plenum space. For example, at the inlet to a portion of equipment there may be one or more plenums, such as a return air plenum, where air from the space is returned to the HVAC unit, an outside air, or fresh air plenum, where fresh air is brought into the unit, and/or a mixed air plenum, where the two previously described airstreams are mixed. There can also be plenums for the supply and return fans, the preheat coil, the cooling coil, the cooling recovery coil, the reheat coil, a unit discharge plenum, a cold deck plenum, a hot deck plenum, and/or a multiplicity of similar areas. 4: Cooling Recovery Coil (CRC), plenum In exemplary embodiments of the present disclosure, a control system may be utilized to control the methods of dehumidifying a space. Control system instrumentation inputs may include one or more of the following:

1. Air filters differential pressure

2. Fresh air intake conditions, Return air conditions, Mixed air conditions, Supply fan plenum conditions, Preheat coil leaving air conditions, Cooling coil leaving air conditions, Cooling Recovery Coil leaving air conditions, Reheat coil leaving air conditions, Supply air conditions, Exhaust air conditions, Space or process load conditions, conditions for other energy recovery or reclaim, or heat transfer systems, including: Dry bulb temperature, Wet bulb temperature, Dewpoint temperature, Relative Humidity Setpoints, including minimum and maximum setpoints, for each of the above variables, Air flow rate, Air flow rate setpoints, including minimum and maximum setpoints, Water flow rates and inlet and outlet temperatures for each coil system, Water flow rates and inlet and outlet temperatures for each energy recovery or heat transfer system, and/or Water flow rates and inlet and outlet temperatures for each cooling and heating system, among other conditions.

3. Energy associated with all coils, energy recovery, heat transfer system, cooling and heating system and their parasitic loads (pumps, fans, etc.)

4. Air distribution/return/exhaust systems and space/process conditions as appropriate fan kW, all fan types, i.e. supply, return, exhaust, lab hood, make up air unit, recirculating air unit, Fan speed, all fan types, i.e. supply, return, exhaust, lab hood, make up air unit, recirculating air unit, Pressures, pressure differentials, relative pressures, filter pressure drop, both setpoints for these variables and the actual value of the variables.

5. Damper position commands, return air, fresh air, economizer VAV, CAV, MZU, FPMXB, other air distribution equipment 6. Damper position, actual, return air, fresh air, economizer VAV, CAV, MZU, FPMXB, other air distribution equipment 7. Information available from a cooling plant—for example, chillers, heat recovery chillers, heat pumps, glycol chillers, ground source heat pumps, primary, secondary and tertiary chilled water pumps, cooling tower fans, condenser water pumps, chilled water supply temperature set point and actual values, evaporator refrigerant temperature, pressure, and approach temperature, condenser water supply temperature set point and actual values, condenser refrigerant temperature, pressure, and approach temperature, refrigerant superheat, chiller kW and motor speed and frequency, chilled water and condenser water flow rates, temperature differentials, pressure differentials. Evaporator and condenser differential pressure minimum and maximum setpoints, compressor Inlet Guide Vane (IGV) position commands and actual positions, on/command status, on/off status, load recycle status, alarm status, refrigerant level, evaporator, refrigerant level, condenser, other information that is available via a network connection, hardwired, RF or Wi-Fi.

Instrumentation can be included to measure the air pressure drop across the cooling recovery coil(s) (CRC). This air pressure drop can be used to calculate the air flow rate of the fresh air entering the system. The CRC is a dry coil, with no condensation occurring, so the air pressure drop will not vary as the loads vary, only as the CFM's (cubic feet per minute) vary, so this is a viable and repeatable control methodology.

The air pressure drop across the CRC(s) can be high enough that reasonably priced instrumentation can be utilized to measure the differential pressure and air flow. With a typical reheat coil, the air pressure drop at 100% air flow may only be 0.01" to 0.03". Pressure drop varies with the square of air flow, so as the air flow drops off, the air pressure drop across the coil drops off very rapidly. HEDS and/or ERHEDS CRC's are larger and have a higher air pressure drop, so the measurements will be more accurate and repeatable.

An ERHEDS-unique control algorithm can be used to modulate the damper systems, fan speed and other variables as needed to maintain the desired fresh air temperature that is delivered to the facility. The fresh air temperature is varied based on time of day, type of day, day of week, occupancy, operational mode, demand controlled ventilation controls, and other variables. In some embodiments, wired or wireless sensors may be placed within a facility to transmit information about temperature and/or relative humidity back to a controller that can modulate variables within a facility.

In some embodiments, the ERHEDS Cooling Recovery Coil (CRC) functionality reduces the cooling loads by approximately 5% to 50%+, so the chiller system size can be reduced by that amount, and the overall energy consumed by the process is reduced by similar or greater amounts.

In some embodiments, the 100% ERHEDS is the first 100% energy recovery system that uses 100% of the input energy to serve the cooling/dehumidification/reheat loads. In some instances, the 100% ERHEDS unit has been specifically designed for dehumidification and humidity control in mothballed or temporarily unused areas of barracks, hospitals, dorms, administrative facilities, or any other presently unoccupied space. The term "barracks" can include all of the various spaces that may be temporarily unoccupied, even overnight or over a weekend. In some embodiments, the 100% ERHEDS unit can be used in a variety of facilities including facilities with leaky façades (e.g., facilities with leaks that allow moisture, such as unwanted moisture in any form, to easily enter the facility). A leak can be as simple as a door or window that allows some air into or out of the facility.

In various embodiments, with the 100% ERHEDS, every single kWh of energy consumed in the process is converted into cooling energy to pull moisture from the air by cooling and condensation, and then converted immediately into heating energy used to warm up the supply air to reduce the relative humidity (RH) of the supply air entering the spaces to be treated.

In some embodiments, the HEDS Cooling Recovery Coil (CRC) functionality reduces the cooling loads by approximately 5% to 50%+, so the chiller system size can be reduced by that amount, and the overall energy consumed by the process is reduced by similar or greater amounts.

In various embodiments, 100% of the energy input is used either for cooling to dry the air out, or for reheating to lower the relative humidity of the air to dry the facilities out. Thus, there may be zero wasted energy when using the 100% ERHEDS. For example, even the power used for the control panels and electric valve and damper actuators can be reclaimed and used as reheat energy for humidity control.

In some embodiments, the present subject matter may be used for climate control of military barracks, or other temporarily unoccupied spaces. For example, many barracks facilities that are not being mothballed are emptied out for weeks or months at a time when the troops are deployed. Some HVAC cooling, heating and air circulation systems must be left fully operational to prevent mold growth inside the barracks, even when the facilities are unoccupied and even when such operation may be expensive. Thus, if the HVAC systems are shut down in these facilities, mold and other harmful biological growth, hereinafter referred to generally as mold, will start to germinate and grow rapidly if RH conditions are not maintained in the facility. Corrosion of and within the facilities is also a common concern. Within two to three weeks after shutting an HVAC system down, there can be substantial amounts of mold throughout the facility. Within months, the facilities will be unusable without completely abating, then rebuilding the buildings at a cost of tens of millions of dollars for each facility to deal with the HAZMAT, demolition and rebuilding costs when they are needed again. Consequently, without the 100% ERHEDS unit described herein, running the HVAC systems to control the humidity and mold in the spaces can require significant energy and ongoing maintenance costs.

For example, with 50 to 60 unoccupied barracks buildings, maintenance will still have to be performed on over 7,000 fan coil units or VAV (variable air volume) terminals. Any room where the Fan Coil Unit (FCU) slips a belt or the motor dies will be overtaken by mold in short order, again creating a HAZMAT condition and substantial remediation costs. Further, there may also be up to 60 sets of chillers and hot water boilers and the associated pumps, or electric heating elements that are pulling energy and wearing out. Additionally, if any of these facilities use water cooled chillers, the chemical treatment for the CT's will also need to be maintained, at least on a weekly basis, or the potential for *legionella* growth and chiller equipment failure will increase significantly. Water use can be significant, and wasted, for these systems.

In various embodiments, for heat rejection, the 100% ERHEDS uses air cooling in the airstream being delivered into the barracks (part of the 100% energy recovery deal), so there may be no need for water consumption or chemical use and the associated labor and cost components.

In some embodiments, the 100% ERHEDS is able to reclaim 100% of the energy input and eliminating any new energy required for reheat.

In various embodiments, the modifications to the standard HEDS unit to provide for a 100% efficient ERHEDS unit include installing an extended discharge air plenum and modifying the controls strategies. Inside the extended or side-streamed plenum, all of the pumps, electrical panels, VFD's (Variable Frequency Drives), and control panels, along with a high efficiency chiller and the associated air cooled dry cooler to reject the heat from the loads and the chiller directly into the airstream are installed. This low dew point, warm to hot air has a very low RH, and it is then sent into each of the rooms in the barracks facility, or into a fresh air or mixed air plenum, where it is distributed throughout the facility. The extended plenum can be directly in the airstream, or located remotely from the ERHEDS unit, the intent is to utilize, the "waste" heat in the system as a heating source of energy, to minimize energy losses and energy use. The air can be delivered "backward" through the exhaust system ductwork, if there are ducts that lead to each conditioned space.

FIG. 1A illustrates an example schematic of a configuration of the ERHEDS unit 100, also referred to herein as unit 100 or system 100, consistent with implementations of the current subject matter. As described herein, the ERHEDS unit can recover 100% of the energy entering the system, such as in the form of heated and/or dehumidified air. Such configurations can be desirable to provide conditioned air to facilities even in situations when the facilities are unoccupied to help to limit or prevent moisture from entering the interior of the facility, and encouraging mold growth. The ERHEDS unit 100 can be an outside air unit (e.g., a unit that takes in air from outside the facility). The unit can be attached to a facility to positively pressurize the facility with hot, dry, and/or low relative humidity air. As mentioned herein, adding hot, dry, and/or low relative humidity air to the facility can help to pull moisture out of the facility, while retaining the hot, dry, and/or low relative humidity air inside of the facility. To remove the moisture in the air within the facility, the moisture would pass through an exhaust system, such as through ductwork and/or control dampers, and/or through leakage, such as through windows or doors of the facility. Later, when the building is reoccupied, the hot, dry, and/or low relative humidity air can be replaced with cooler, dry, and/or low relative humidity air.

As shown in FIG. 1A, the dashed-dashed line represents an airflow path in situations in which the 100% ERHEDS unit 100 is being used, such as when the facility is unoccupied for a period of time. The ERHEDS unit 100 can include one or more louvers 102, such as rain louvers, facing the environment to prevent rain and/or additional moisture from entering the unit. The louvers 102 can be positioned at an inlet 104 of the ERHEDS unit 100. The ERHEDS unit 100 can include an inlet plenum 106 and/or a fresh air plenum (FAP) 108 near the louvers. The FAP 108 can include an FAP drain pan 110 to collect rain and/or other moisture that passes into the ERHEDS unit 100, such as through the louvers 102. The ERHEDS unit 100 can include one or more air filters 112, a supply fan 114 that can draw through air and/or blow through air, and/or a supply fan discharge plenum 116. In some configurations, the one or more air filters 112 can be positioned on one side of the supply fan 114 (e.g., closer to the inlet 104) to filter the air before the air passes through the supply fan 114. In some configurations, the one or more air filters 112 are positioned on an opposite side of the supply fan 114 such that the air is filtered after passing through the supply fan 114.

In some embodiments, there is a MERV 8 filter bank followed by a MERV 14 filter bank, in series with the Cooling Coil (CC) 118, which can be in series with the Cooling Recovery Coil (CRC) 120 at the front end of the unit 100. The air filtration can take many forms; one such method is described herein.

In some implementations, the supply fan 114 can blow or draw the air past a preheat coil (PHC) 122. The PHC 122 can be positioned at least partially within or adjacent to a PHC plenum 123, but a PHC plenum 123 is not required for the system to function properly, the PHC 122 can be located in the same coil casing as the cooling coil 118, with adequate space and access to allow both sides of both coils to be cleaned using commonly available cleaning agents and tools. The PHC 122 can recover at least some heat energy (such as from a condenser) and/or load the system or a portion of the system, such as the chiller and/or cooling coil 118, up to 100%, even in some situations, in which the outside air is cool and/or has high relative humidity (e.g., 65° F. and wet air in some circumstances). Loading the chiller (directly and/or via the cooling cool 118) can generate a greater amount of heat and/or energy on the leaving air side of the unit 100, which as described below, can be rejected to further heat the air passing into the facility. In such situations, it can be desirable to dehumidify the air. Dehumidifying the air can help to reduce mold growth or other undesirable biological growth inside the facility. Dehumidifying the air within the ERHEDS unit 100, prior to the air exiting the unit 100, can help to reduce mold growth or other undesirable biological growth inside the AHU, ductwork and facility.

In some implementations, the air passes a cooling coil (CC) 118. In some implementations, the air passes directly from the supply fan 114 to the CC 118. In some implementations, the air passes the cooling coil 118 after being pre-heated by the PHC 122. The CC 118 can condense moisture out of the air that passes the CC 118 to generate cool air that has a high relative humidity. The CC 118 can be positioned at least partially within or adjacent to a cold plenum 154, but a cold plenum 154 is not required for the system to function properly. The air that passes through to the cold plenum may be cold and with high relative humidity. As mentioned above, the PHC 122 can be located in the same coil casing as the cooling coil 118, with adequate space and access to allow both sides of both coils to be cleaned using commonly available cleaning agents and tools. The CC 118 and/or CRC 120 can include a drain pan 156 to collect moisture that passes through the ERHEDS unit 100. In some embodiments, a condensed moisture reclamation and purification system 158 can be positioned adjacent to the CC 118.

In some implementations, the system can include Ultra-Violet Germicidal Irradiation (UVGI) 124, Photocatalytic Oxidation (PCO) 126, and other chemical/biological neutralizing and/or filtration systems before the air passes to the CRC 120 and/or after passing through the CRC 120. Not all potential options have been shown. A unique benefit of ERHEDS that is not available with other systems is that the lower air velocities designed into ERHEDS units provides significantly longer contact time between UVGI 124, PCO 126, and other chemical and/or biological risk mitigation systems, and/or heating, reheating and filtration systems, which can significantly improve their effectiveness.

The UVGI system 124 can be positioned before or after the PCO system 126. In some implementations, moisture can form on or near at least a portion of the cooling coil 118 as the air passing the cooling coil 118 is cooled. The UVGI 124 can disable potential mold or other biological growth on or near the cooling coil 118. The PCO 126 can kill the mold or other biological growth. Such configurations can be desirable since the CC 118 implemented in the ERHEDS unit 100 may have a large surface area, and the air passing through the CC 118 may be exposed to the CC 118 for a long period of time. Such chemical/biological neutralizing and/or filtration systems can help to reduce unwanted mold or other biological growth within the system.

In some implementations, the air may hit the CC 118 at approximately 85° F. The air may hit the CC 118 at temperatures lower than 85° F., such as down to 54° F. to 84° F., or lower. The air may hit the CC 118 at temperatures significantly higher than 85° F., such as up to or greater than 100° F. to 150° F., 150° F. to 200° F., 200° F. to 250° F., 250° F. to 300° F., 300° F. to 350° F., 350° F. to 400° F., 400° F. to 450° F., 450° F. to 500° F., 500° F. to 550° F., or greater. In such situations, the air can be cooled to 53° F., for example, with a high relative humidity. The cold air can be heated to help to limit or prevent mold or other growth in the AHU, ductwork, or the facility caused by moisture condensing onto materials within the AHU, ductwork, or the facility.

Air can pass through the CRC 120 to heat the cold air, resulting in cool air with a high, but lower relative humidity. The CRC 120 can reduce the cooling load on the chiller by 5% to >65%, load dependent. For example, the fluid within the CC 118 can be warmed as the air passing through the CC 118 is cooled. The warm water can flow directly or indirectly into the CRC 120 to heat the cold air. The CRC 120 can be positioned at least partially within or adjacent to a CRC plenum 160, but a CRC plenum 160 is not required for the system to function properly. In some embodiments, the CRC plenum can be an equipment room that houses all cooling equipment. Example piping configurations are illustrated in FIGS. 2A, 2B, 3A, 3B, 4A, 4B, 5A, 5B are consistent with implementations of the current subject matter.

In some embodiments, ERHEDS unit 100 may optionally include mounting tabs 150 for photovoltaic systems and solar thermal panels. In various embodiments, other types of power may be provided in addition to, or instead of, solar power. ERHEDS unit 100 may include separation flanges 152 to allow normal freight and simplified installation into tight spaces. In some embodiments, the normal freight may be the size of a shipping container. ERHEDS unit 100 may also include alternating current motors, with direct current motors/equipment as an option, and/or variable speed motors (not pictured).

In configurations in which the facility is unoccupied for periods of time and/or only hot air is to be provided to the facility, one or more dampers 128 to control airflow leading to the equipment room 130 may be opened and/or control dampers 132 for HEDS loads that lead to ductwork 134 may be closed. Such configurations can allow all of the air passing through the CRC 120 to pass directly into the equipment room 130.

In various embodiments, after the air passes through the CRC 120 to reduce the chiller load and raise the CRC leaving air temperature to lower the RH of that air, the air passes through a section that contains all of the equipment. The equipment room 130 can include the control panels 136, electrical panels, electrical gear, the pump Variable Frequency Drives (VFD's), the pumps, the chiller and/or the air cooled heat rejection coil and associated fans for the chiller condenser side as described above, among other components or equipment. In an exemplary embodiment, a battery location 162 is depicted in FIG. 1A. However, one or more batteries may be positioned in a different location than that depicted in the exemplary figure. Equipment room 130 can also include a drain pan 164 to collect moisture that passes through the ERHEDS unit 100.

The equipment room 130 can include an air inlet and dampers 128, 138 positioned at the top and/or side of the equipment room. In the configuration in which the facility is unoccupied for periods of time and/or only hot air is to be provided to the facility, the dampers 128, 138 positioned at the top and/or side of the equipment room may be closed. Closing the dampers in the equipment room can direct air to the heat rejection coil (HRC) 140. In some configurations the ERHEDS unit 100 can include a fan or fans 142 to blow air across the equipment room 130, or pull air through the equipment room 130. The fan 142 and/or the closed inlet dampers (128 and/or 138) create a pressurized area within the ERHEDS unit 100. In various embodiments, sensing equipment is utilized in order to maintain the facility at a slight positive pressure relative to ambient to help reduce vapor migration into the spaces. In some embodiments, the supply air leaving the 100% ERHEDS provides lower than 20% to 40% RH conditions for much of the dehumidification season. These conditions are far too dry for many kinds of mold to germinate and grow.

As the air passes through the equipment room 130, the air can be heated, since the equipment positioned within the equipment room gives off heat. In some implementations, the air exiting the equipment room 130 can have a higher temperature than the air entering the equipment room 130.

In some embodiments, all or some of the equipment and mechanical and electrical systems that consume energy are in the airstream, so, excepting skin losses on the unit, every single kWh of energy that enters the 100% ERHEDS unit 100 can be used to create low dew point, warm to hot, very low relative humidity air. Thus, 100% of the electrical energy that is used to provide cooling and dehumidification can be recaptured and used to reheat the supply air to lower the RH of the air entering the spaces. In some embodiments, some or all of the equipment and mechanical and electrical systems that consume energy are in the airstream, so, excepting skin losses on the unit, a significant amount of the energy that enters the 100% ERHEDS unit is used to create low dew point, warm to hot, very low relative humidity air. Thus, with this embodiment, a significant portion of the electrical energy that is used to provide cooling and dehumidification is recaptured and used to reheat the supply air to lower the RH of the air entering the spaces.

In some implementations, the air can be blown from the equipment room 130 to the HRC 140. The air can be blown across the HRC 140 through the open damper 144, which can allow the hot, dry air to pass through a hot/dry air plenum 166 into ductwork 146 and/or a room in a facility to heat the facility and keep moisture out of the facility. In such configurations, dampers 148 may be closed to prevent the hot air from escaping the ERHEDS unit 100. In some embodiments, dampers 148 can include rain shields. The HRC 140 can reject heat to cause the temperature of the air passing through the HRC 140 to increase significantly, depending on the loads being served by the cooling plant. In some embodiments, the hot/dry air plenum 166 can include one or more preheat, reheat, and/or energy recovery coils. In various embodiments, an after filtration system 168 may be positioned adjacent to the HRC 140 and within the airstream of the ERHEDS unit 100.

In lieu of permanently installed components, easily removed fittings can be installed to make a retrofit simpler. For example, some of the removable components may include the following: control dampers 132 and ductwork 134 for ERHEDS fresh air loads, dampers 128 to control air flow, the inlet, and dampers 138 for cooling air for HEDS operation, the fan array 142 for the air-cooled condenser or fluid cooler, control dampers and rain shield 148, and control dampers 144.

Figure 1B:
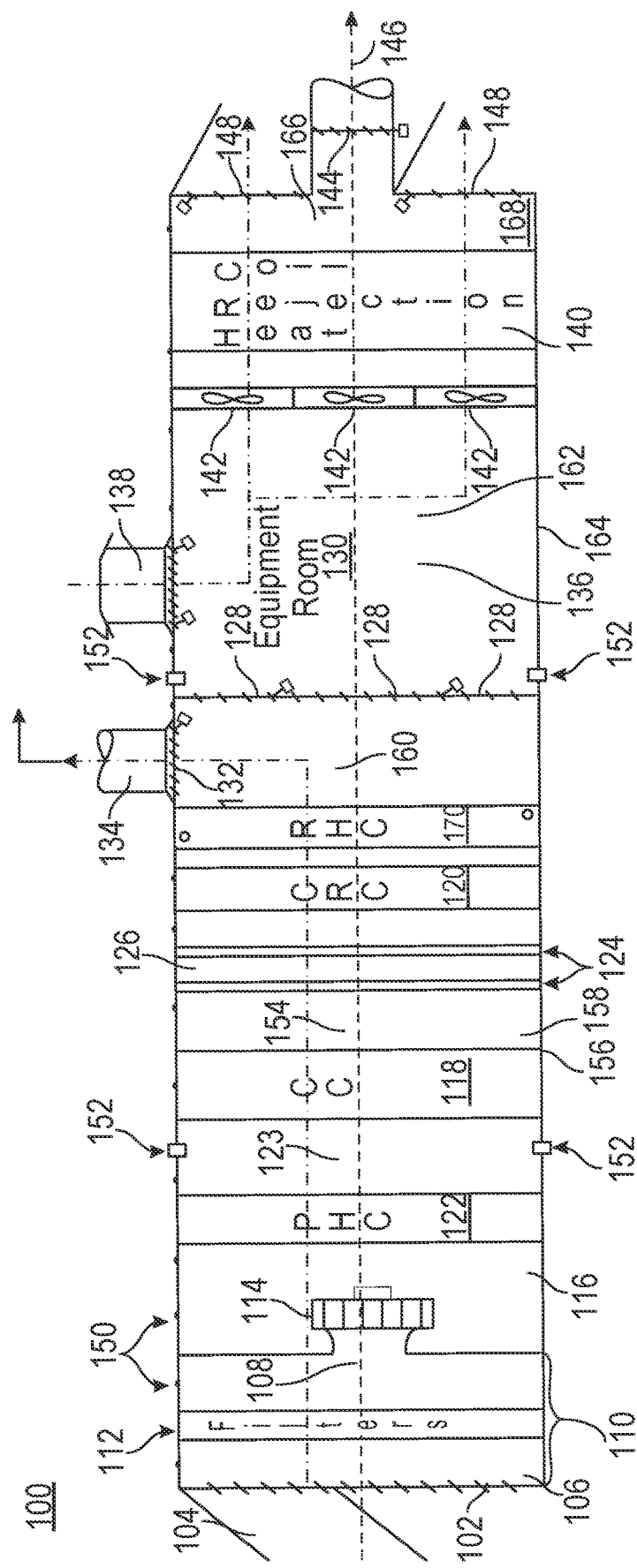
FIG. 1B is a schematic diagram of an exemplary climate control system incorporating a reheat coil that can be used to practice aspects of the present subject matter.
Figure 2A:
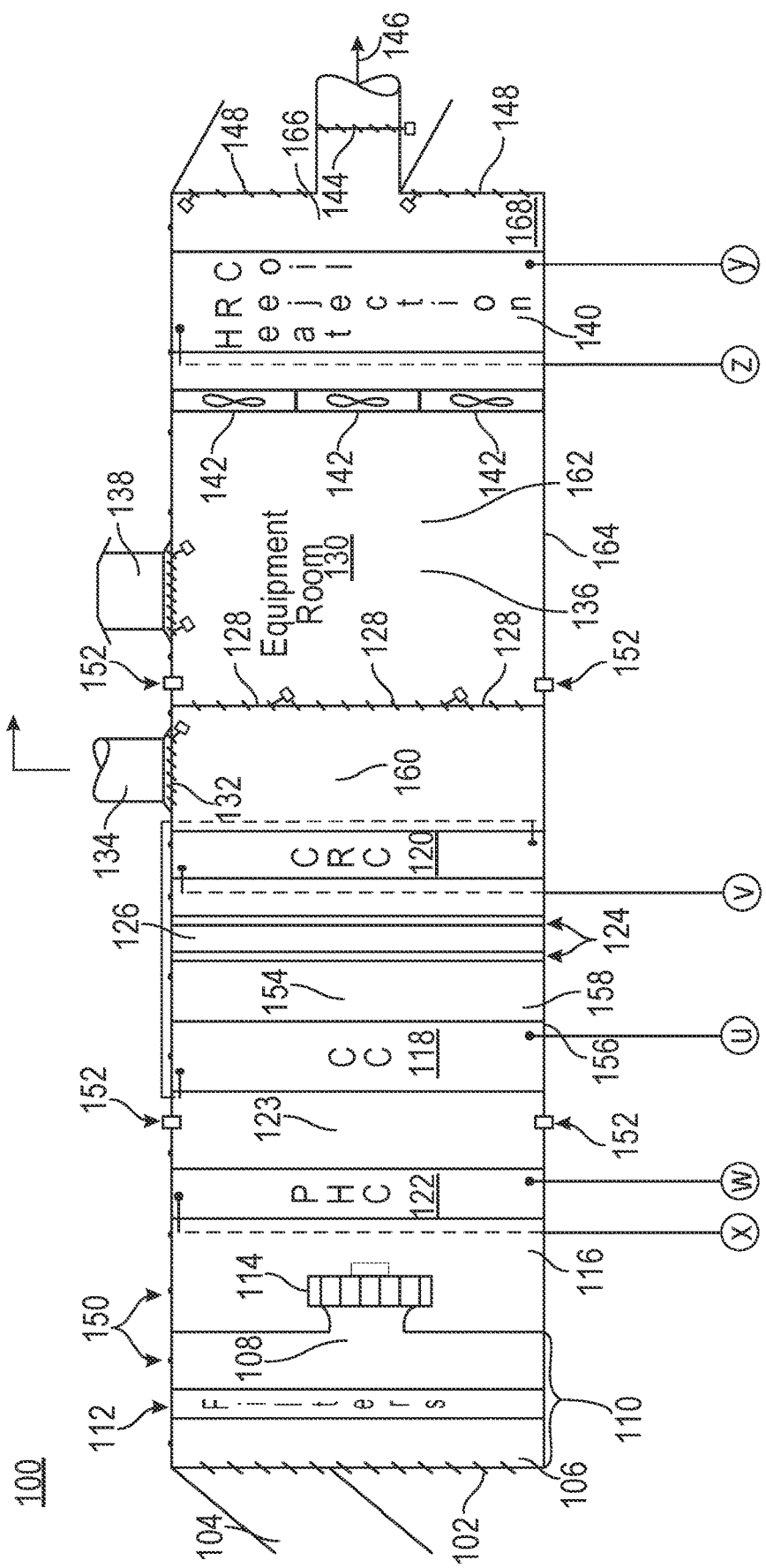
FIG. 2A is a schematic diagram of an example of a climate control system similar to the climate control system of FIG. 1A, with example piping added.
Figure 2B:
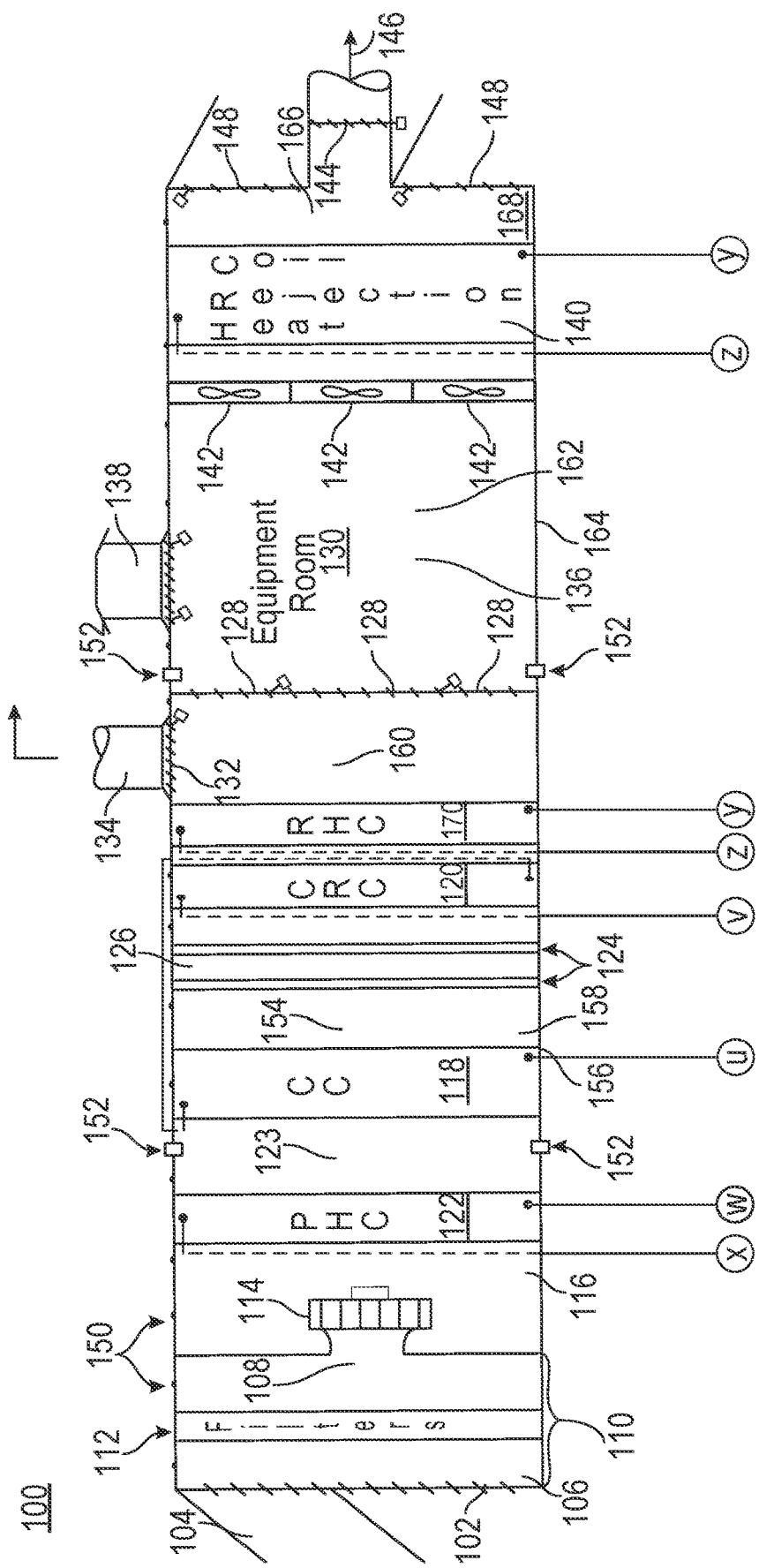
FIG. 2B is a schematic diagram of an example of a climate control system similar to the climate control system of FIG. 1B, with example piping added.

FIG. 2A illustrates an example of the ERHEDS unit 100 that is the same or similar to the ERHEDS unit 100 shown in FIG. 1A, with example piping configurations for systems used in locations that require heating and/or cooling or dehumidification. The piping and/or tubing configurations can allow the use of reclaimed energy from the cooling process to be used as a pre-heating energy source. The pre-heating energy source can false-load the compressor and allow the unit to not cycle on and off, and/or can allow the unit to provide heated air to the space at a relatively low RH level. FIG. 2B is a schematic diagram of an example of a climate control system similar to the climate control system of FIG. 1B, with example piping added.

Figure 3A:
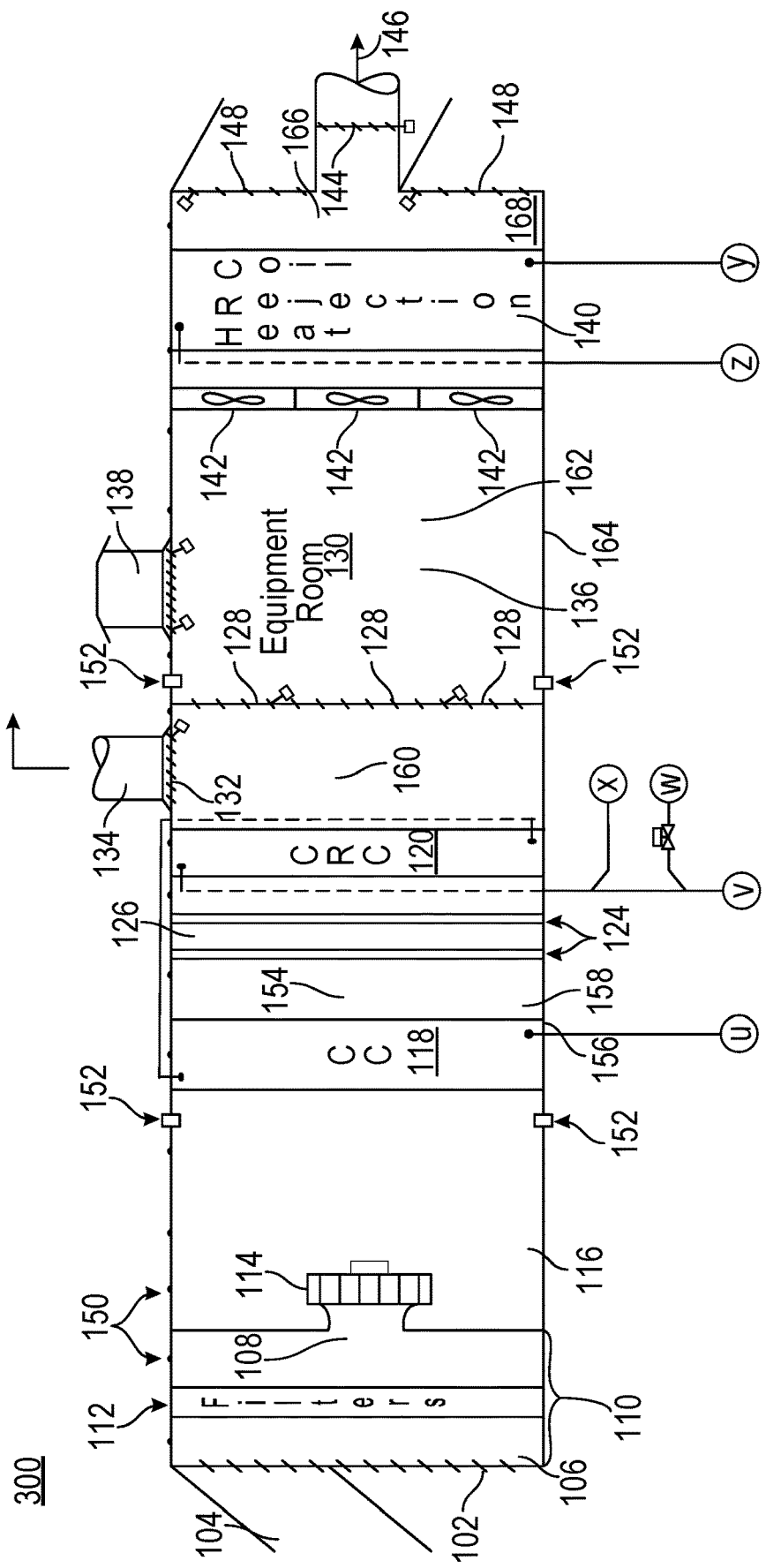
FIG. 3A is a schematic diagram of an example of a climate control system similar to the climate control system of FIG. 1A, with example piping added.
Figure 3B:
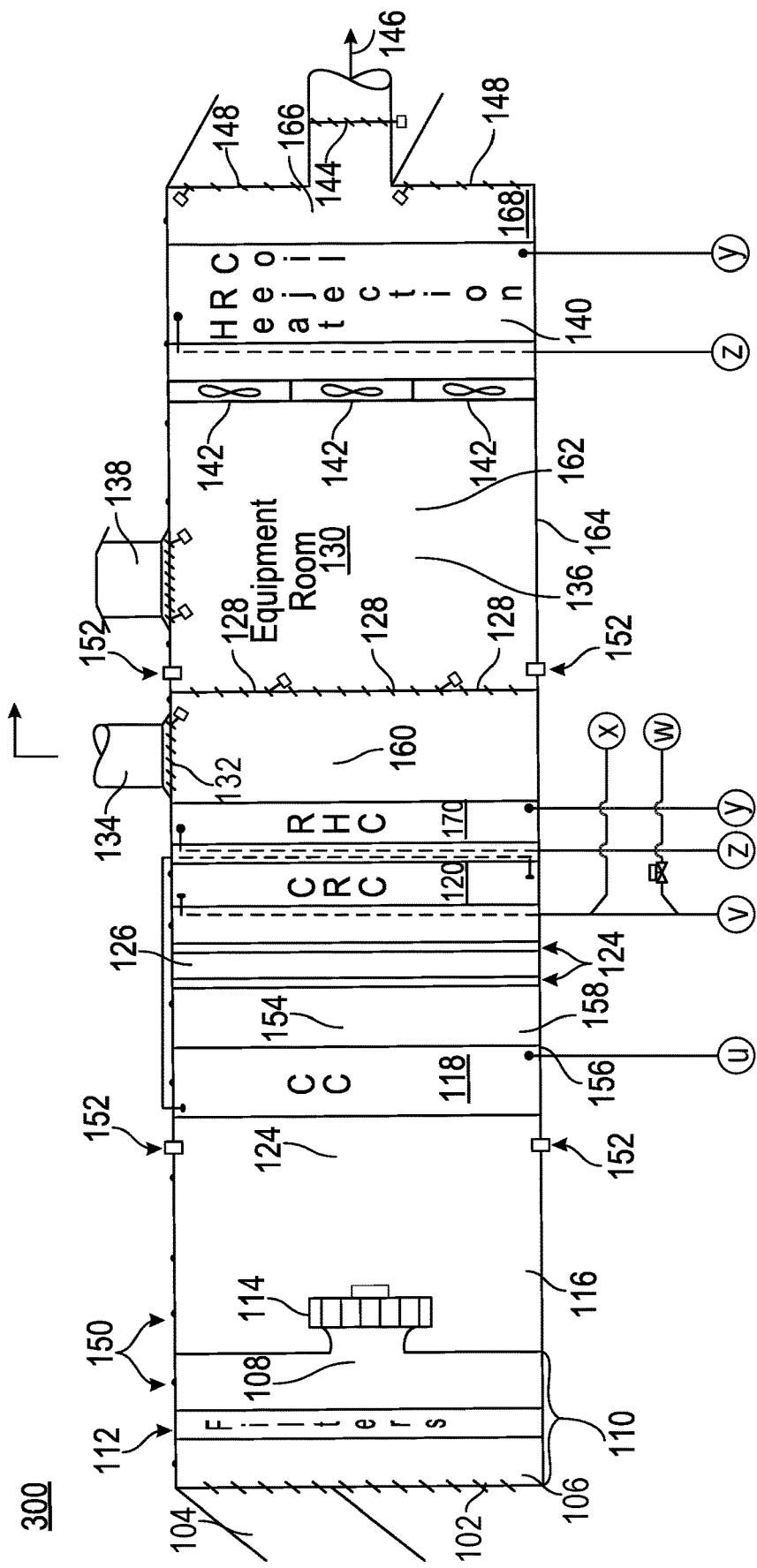
FIG. 3B is a schematic diagram of an example of a climate control system similar to the climate control system of FIG. 1B, with example piping added.

FIG. 3A illustrates an example of the ERHEDS unit 300 that is the same or similar to the ERHEDS unit 100 shown in FIG. 1A, with example piping configurations for systems used in locations that only require cooling and/or dehumidification. FIG. 3B is a schematic diagram of an example of a climate control system similar to the climate control system of FIG. 1B, with example piping added for systems used in locations that only require cooling and/or dehumidification.

In some implementations, as shown in at least FIGS. 1B, 2B, and 3B, a reheat coil (RHC) 170 can be installed between the CRC 120 and the dampers/ductwork 132/134 and the dampers 128 to allow additional heat to be added to the airstream when the systems is operating in the HEDS mode, providing cooled, dehumidified and/or reheated air to the facility.

As shown in FIG. 1A, the dashed-dot line represents an airflow path in situations in which the ERHEDS unit 100 is similar to a HEDS style unit, such as when the facility is occupied and/or the system 100 is providing cool dehumidified air to the facility. The system 100 can switch automatically between the system 100 that provides hot air or hot dehumidified air to the facility, and the system that provides cool dehumidified air to the facility. In some implementations, the system 100 can be manually switched between the system 100 that provides hot air or hot dehumidified air to the facility, and the system 100 that provides cool dehumidified air to the facility. The system 100 that provides cool dehumidified air to the facility can include many of the same or similar features as described above.

When the system 100 switches between the system 100 that provides hot air or hot dehumidified air to the facility and the system 100 that provides cool dehumidified air to the facility, one or more dampers may be opened and/or closed. For example, in such configurations, the dampers 128 to control airflow may be closed and the damper 144 that allows air to pass into ductwork 146 to the facility from the HRC 140 may be closed. In some configurations, the control dampers 132 for HEDS loads may be opened, the inlet dampers 138 for cooling air may be opened, and/or the outlet dampers 148 for allowing the air to pass from the HRC 140 to the outside environment, may be opened, among other configurations. In some embodiments, the outside air may be mixed with return air, and in other embodiments, all air entering the unit 100 may be recirculated/return air.

As shown in at least FIG. 1A, the air can pass into the unit as described above, and instead of passing through the dampers 128 (which are closed in this configuration), the cool dehumidified air (and in some cases, reheated air) can exit the unit through the dampers 132 and pass into the ductwork 134. The cool, dehumidified, and/or reheated air can be blown into the facility or other HVAC equipment or loads through the ductwork.

In some implementations, when the dampers 138 are opened, air can flow into and/or be sucked into the equipment room 130 through the inlet 138. The air in the equipment room 130 can be heated at least in part due to the equipment positioned within the equipment room giving off heat. The heated air can pass through the HRC 140, which rejects heat, causing the temperature of the air to increase. The HRC 140 can reclaim the heat from the cooling system, and reject that heat to cause the temperature of the air passing through the HRC 140 to increase significantly, depending on the loads being served by the cooling plant. The heated air can then pass through the open dampers 148 to the outside environment, and out of the unit 100.

In various embodiments, installation is relatively simple as there are only two connections to this unit—a single point power connection, and the ductwork connection to connect it to the barracks fresh air, dedicated outdoor air system (DOAS) or exhaust fan ductwork or plenum systems to distribute the warm to hot, low dew point, very low RH air throughout the barracks. The warm to hot air temperature acts to lower the RH of the air entering the spaces which helps to offset any moisture that makes its way into the barracks. Most barracks are "leaky" with respect to air—a lot of outside air makes it into each space, even when the windows and doors are closed, so it is necessary to provide very low RH air to the spaces to overcome this problem.

In various embodiments, the 100% ERHEDS operates for 12 hours or less per day, cutting energy use by another 40% or more. In some instances, depending on how tight or loose the facility is to ambient conditions, the 100% ERHEDS run-time may be dropped down to 4 to 6 hours per day, or the run-time may be as high as 14 hours per day. For facilities that have a very high air leakage rate, the ERHEDS run time may need to be continuous. The runtime and supply air volume, dew point and temperature conditions can be optimized continually (for example, using the computer system 700), based on measured internal conditions, to minimize overall energy consumption, while ensuring dry indoor space conditions and reducing mold growth, corrosion and other RH-related issues to the greatest extent possible.

In various embodiments, when the barracks or other mothballed or temporarily unoccupied or unused buildings get re-occupied, it is a relatively simple task to convert the 100% ERHEDS unit back into an ASHRAE 90.1 Prescriptive Energy Code compliant DOAS unit to provide clean, low dew point fresh air to the facility. ERHEDS is one of the few HVAC system designs that is ASHRAE 90.1 Prescriptive Energy Code compliant regarding relative humidity control. The vast majority of HVAC systems in Federal facilities do not comply with recent versions of ASHRAE 90.1 Prescriptive Energy Code. In general, the ASHRAE 90.1 Prescriptive Energy Code does not allow any form of heating or reheating of air for relative humidity control, if the heat or reheat is not from a reclaimed or solar-thermal source. Other potential ASHRAE 90.1 Prescriptive Energy Code solutions include the following, among others:

1. Water and refrigerant based run around coils.
2. Air to air heat exchangers.
3. Rotary wheel and desiccant based systems.
4. Solar-thermal reheat energy source.
5. Reclaimed energy from other sources.

These other potential solutions all exhibit some combination of the following problems:

1. Can hurt chilled water system Temperature Differential (TD), increasing chiller plant energy use.
2. Little to no supply air temperature control, "you get what you get".
3. Unit may not physically fit in the available space.
4. Much more ductwork.
5. Longer, taller or wider AHU.
6. Increased maintenance costs and issues.
7. Higher air pressure drop, (up to 2" added on supply side and up to 2" added on exhaust side).
8. More fan energy due to higher air pressure drops.
9. Condensate re-evaporation when blown off of the cooling coil, with the potential for mold growth.
10. May require a new, added source of heat to regenerate the desiccant wheel.
11. Many desiccant based systems require post-unit cooling to drop the supply air temperature down, (the supply air temperature can be 110° F. on the discharge side of the wheel).
12. May require pre-unit heat addition to lower the entering air relative humidity.
13. Increased piping, controls, and installation costs.

In various embodiments, the 100% ERHEDS, incorporates simple, but advanced technology that does useful work with 100%, or nearly 100%, of the input energy. There is zero energy waste in some embodiments. The reclamation of cooling energy as a reheat energy source is advanced, simple, and novel. Further, the ability to reclaim 100% of the energy input into the cooling/dehumidification/reheat process while using reclaimed energy from the cooling system to reduce loads on the cooling system has never been done to save unoccupied barracks from becoming mold infested.

In some embodiments, the present subject matter captures 95% of the energy used to drive water around, as well as the 5% heat that escapes into the room, in our case the supply fan discharge plenum 116. For example, even 100% of the energy consumed by the control panels 136 and the valve actuators is reclaimed to lower the RH of the supply air.

In various embodiments, the present subject matter allows for "exceptional energy savings". No other technology can reduce both the cooling and heating loads related to temperature and relative humidity control at the same time, eliminating at least 5% of the cooling plant loads and 100% of the reheat energy loads. Two Department of Defense Environmental Security Technology Certification Program (ESTCP) projects are showing cooling plant load reductions between 20% at the low end and at least 65% at the high end, averaging around 30%, while completely eliminating the need to run the boilers, or other heating elements for RH control.

In some embodiments, the 100% ERHEDS design takes the HEDS savings to the highest potential end result—100% energy utilization. The 100% ERHEDS unit is far more efficient than having to run the HVAC systems for space RH control. Even if some of the barracks are equipped with a newer technology DOAS system that can provide 50% RH, low dew point air, the cost to run the chiller at low loads, while running the boiler at very low loads is extremely high due to equipment and system on/off cycling and inefficiencies. Direct Expansion (DX) based DOAS systems can be ineffective at controlling RH unless the supply air dewpoint temperature is maintained below 55° F. and the compressor never cycles off when the supply fan is in operation.

In various embodiments, the base case chiller uses additional condenser fan energy to reject all of the heat to the atmosphere, and the base case boiler loses substantial heat due to cycling on and off at very low loads.

In some embodiments, the base case barracks fan coil units use very inefficient fractional HP motors and fan wheels and must be run continuously to ensure that RH conditions are maintained, even when the barracks are unoccupied. Since the 100% ERHEDS delivers low dew point air at very low RH levels, it is possible to only run it for a fewer number of hours compared to existing systems (e.g., 12 hours per day or less), vs. 24 hours per day for the base case, while still keeping the facilities dried out. For example, if the barracks that are being mothballed are of a newer design and are equipped with a DOAS system, there are still operational and energy issues to be overcome as described above. If the DOAS has no reheat function, and pumps cold, high RH air into a wet space, it has the potential to create bad mold situations during certain times of the year. Furthermore, some DOAS systems use relatively high air velocities across the cooling coils, and water droplets can be blown off of the cooling coils, into the downstream plenums or ductwork, creating an excellent breeding ground for mold.

In various embodiments, the present subject matter integrates several mechanical and control optimization strategies, all into one self-contained package. In some embodiments, the 100% ERHEDS controls feedback to the chiller to reset the chilled water supply temperature and the chilled water system flow rate to minimize chiller plant energy waste while meeting barracks internal temperature and RH criteria. Monitoring of internal space conditions is utilized to reduce equipment run time, while simultaneously maintaining the spaces at low RH conditions to reduce the potential for biological growth.

In various embodiments, the following numerated list of results below may be accomplished by the embodiments of the ERHEDS system described herein. The following list is not exhaustive, as the system described herein can accomplish other and/or additional results.

1. Eliminates mold growth associated with the HVAC system. The initial reason for the present subject matter is eliminating mold growth in barracks and other military facilities. In the case of ERHEDS, it is to prevent mold growth in unoccupied facilities—they still need RH control in the cooling/dehumidification season, or biological growth will occur.

2. Essentially eliminates mold remediation and reconstruction costs associated with HVAC system-caused mold growth.

3. Eliminates HAZMAT issues associated with HVAC system-caused mold growth.

4. Reduces equipment maintenance. No need to run existing equipment to maintain RH conditions inside unoccupied spaces.

5. Eliminates poor efficiency, low load operation of existing equipment.

6. Recovers 100% of the input energy in a useful manner.

7. Raises indoor air temperature, lowers indoor RH.

8. Helps to dry out already wet/damp spaces.

9. Reduces cooling loads related to RH control by 5% to >65%. Reduces overall cooling plant and heating plant energy related to keeping barracks dried out by 10% to 80%+.

10. Single point power connection, single point duct connection—easy to install.

11. Completely self-contained, only needs power and duct connection.

12. Exterior alarm lights and strobes to alert others if a failure occurs.

13. Fault detection and diagnostics equipped.

14. Algorithms to determine need/frequency/duration of operation based on sampling of internal conditions—reduces run times and power demands of the unit even further.

15. Resetting flows, volume, loads continuously as needed—optimization algorithms.

16. ERHEDS can be converted back to HEDS—dehumidification units when barracks are re-occupied, manually or automatically.

17. Scalable.

18. Can be applied in many applications that need warm to hot, dry air and cool to cold, dry air.

19. Massive reduction in fan energy as well as chiller and boiler plant or other heat source energy.

20. No new source of heat is required for relative humidity control.

21. All electric, no fossil fuels required.

22. Can be renewables powered.

23. Can be equipped with energy storage.

24. Saves on power plant and chiller plant water, chemical and energy consumption.

25. Can use air cooled refrigerant condenser or air cooled fluid cooler as heat rejection system to final airstream, or to atmosphere, as needed.

26. Eliminates need for mechanical room for chiller.

27. ASHRAE 15 compliant construction.

28. Maintains positive pressurization for the building to keep moisture being pushed outward.

29. Built in pressurization controls.

30. Reduces installed equipment run time and maintenance. For example, 150 units per barracks can be shut down. In some embodiments, the barracks HVAC equipment run time varies from zero hours/year (for ERHEDS or 100% ERHEDS) vs. 8760 hours per year for existing conditions.

31. Portable, skid mounted.

32. Can be built in shipping container sized modules.

33. Can be configured to automatically convert between ERHEDS and HEDS operation as facilities vary between unoccupied and occupied. This can be done frequently with no negative effects on the equipment or facility.

34. Saves huge amounts of energy related to RH control (40%+ in many applications). Energy independence, lowers pollution, favorable to a green audience.

35. Reduces fossil fuel use. Extends America's reserves of energy, renewables friendly, and lowers pollution. Reduces GHG/climate change issues 36. Control algorithms can help shape electrical grid loads and are renewable friendly. Frequency regulation (reg-up, reg-down) demand response, broad increases and decreases in the grid demand profile and are responsive to grid needs. In some embodiments, auto-senses the need to reg-up and reg-down, or ramp up and ramp down (voltage, frequency sensing in some options). In other embodiments, signals are provided to direct the system to operate those various sequences of operation.

37. Reduces power plant and facility water use/waste. Less chiller energy use equates to less water and chemical consumption for water cooled chillers. Less site energy use equates to less power plant water use for water cooled power plants, and less chemicals as well for cooling tower cooled plants. Water use/waste is an upcoming issue.

38. Increases the size of Energy Service Performance Contract (ESPC)/Utility Energy Service Contract (UESC) public/private partnerships to save the government agencies (and taxpayers) even more money. HEDS and ERHEDS can provide a rapid financial payback that can be leveraged to include more projects for government clients. Helps to reduce capital spending by the government.

39. Allows facilities that have been built with "two-pipe" water distribution systems to perform reheat duties for reheat/RH control. Two-pipe systems provide cooling water in the cooling/dehumidification season, and heating water in the heating season, there is no heating source available for reheat in the dehumidification season and there is no cost effective way to perform cooling/dehumidification/reheat functions without HEDS and ERHEDS installations.

40. Reduces manpower needs via automatic resets. Controllers for HEDS and ERHEDS automatically reset air volume, dew point and dry bulb temperatures, chilled water supply temperature and differential pressure set-points based on the needs, loads and internal and external commands. No need for operator intervention. Saves energy.

41. Incorporates learning algorithms, to continuously learn what is needed to keep the facility under control and mold free. HEDS and ERHEDS control strategies can utilize variable space/load dew point and dry bulb temperature set-points as needed for comfort, process, product and mold control situations based on the materials of construction of the facility and the facility and process needs. Similar to the above, control strategies can be used based on weather forecasts and facility/load response to previous events and conditions (learning algorithm). Similar to the above, the HEDS control strategy can be driven by occupancy, production rates, anticipated occupancy or anticipated production rates, as well as electrical grid and micro grid needs.

42. Generates water for other uses. Condensate generated by the system can be used for pre-cooling of loads, filtered and purified for various uses, or use unpurified for industrial uses.

ERHEDS Based Ground Source Heat Pump Earth Field Capacity Enhancement System

FIGS. 4A, 4B, 5A, and 5B depict examples of a cooling/heating plant based on a modified heat pump design (or standard chiller-based design) that is built to provide relative humidity control, even down to 0% cooling loads, while enhancing the capacity of the earth-coupled field that it is attached to.

The cooling/heating plant may include a heat pump system or cooling system utilizing a ground coupled heat rejection system 400, a heating/cooling energy recovery unit #1 (HCRU #1) 410, a heating/cooling energy recovery unit #2 (HCRU #2) 420, additional heating/cooling energy recovery units (HCRU #XXXX) 430, a ground coupled field 440 for heat rejection or heat reclamation, a cooling augmentation system 450 that allows added "cooling energy" to be injected into the piping loop for instantaneous use, or injected into the ground coupled field, for use at a later time, a heating augmentation system 460 that allows added "heating energy" to be injected into the piping loop for instantaneous use, or injected into the ground coupled field, for use at a later time, and other components Many existing earth sourced systems are no longer effective, as their heat rejection/absorption fields are undersized for the loads being served. Heating dominated HVAC or process load systems tend to overcool the earth source over time, and cooling dominated HVAC or process load systems tend to overheat the earth source over time. The current subject matter can bring those systems back to life.

In addition to increasing the effective capacity of the earth to store and reclaim energy, the current subject matter can solve many common problems associated with HVAC heating, cooling, dehumidification, reheat systems. Performance, ability to control relative humidity and mold growth, resiliency, reliability, robustness and energy consumption are addressed. The ability to be controlled to influence the electrical load on the grid by ramping up and ramping down, and to respond as a Distributed Energy Resource (DER), and be included in Demand Response (DR) programs, while still maintaining relative humidity control in the conditioned spaces, while consuming zero site water for heat rejections, is of paramount importance, and is unique to the systems described herein.

Figure 4A:
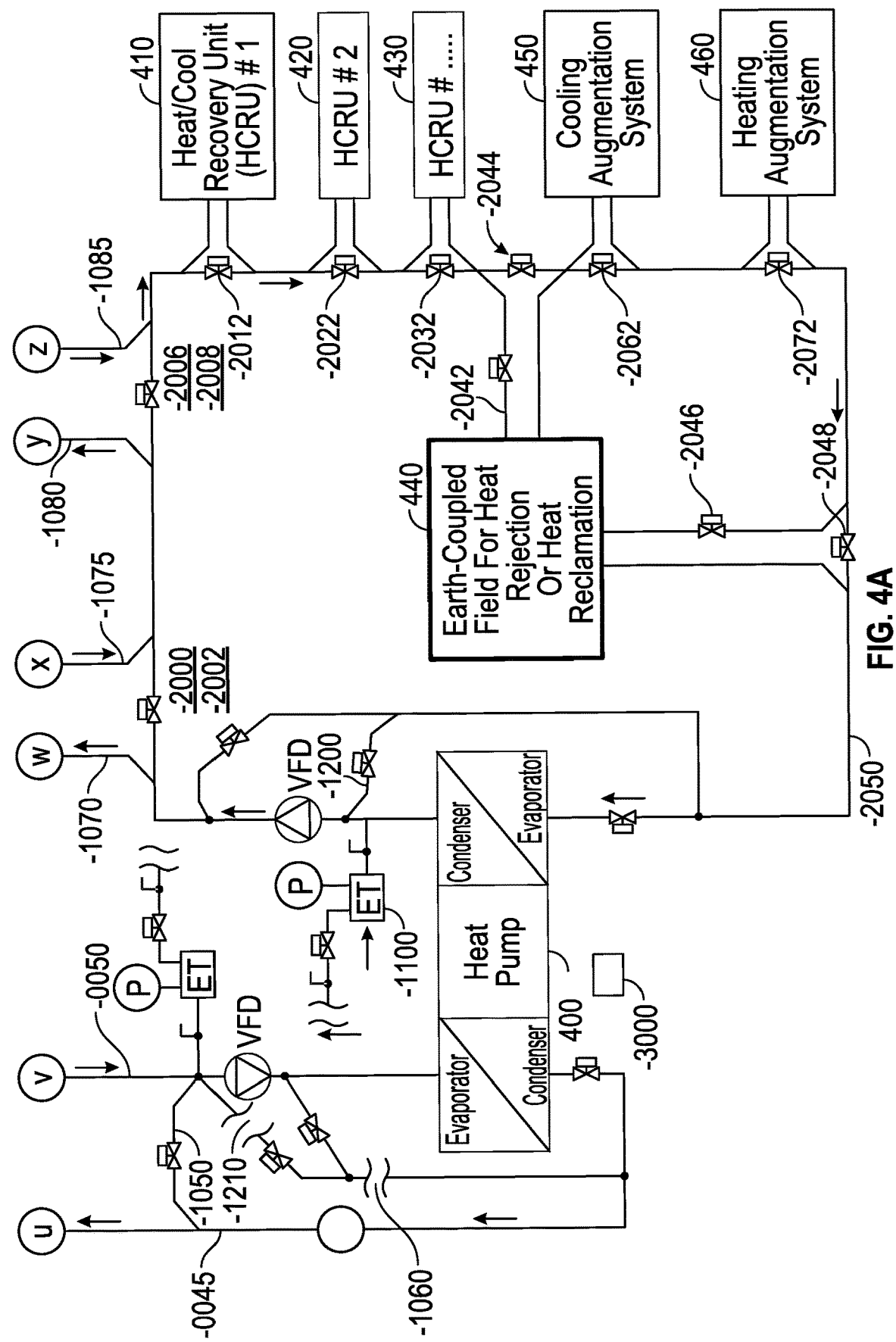
FIGS. 4A, 4B, 5A, and 5B depict examples of a cooling/heating plant based on a modified heat pump design (or standard chiller-based design) that is built to provide relative humidity control, even down to 0% cooling loads, while enhancing the capacity of the earth-coupled field to which it is attached, or reducing heat rejection loads and water and chemical use.
Figure 4B:
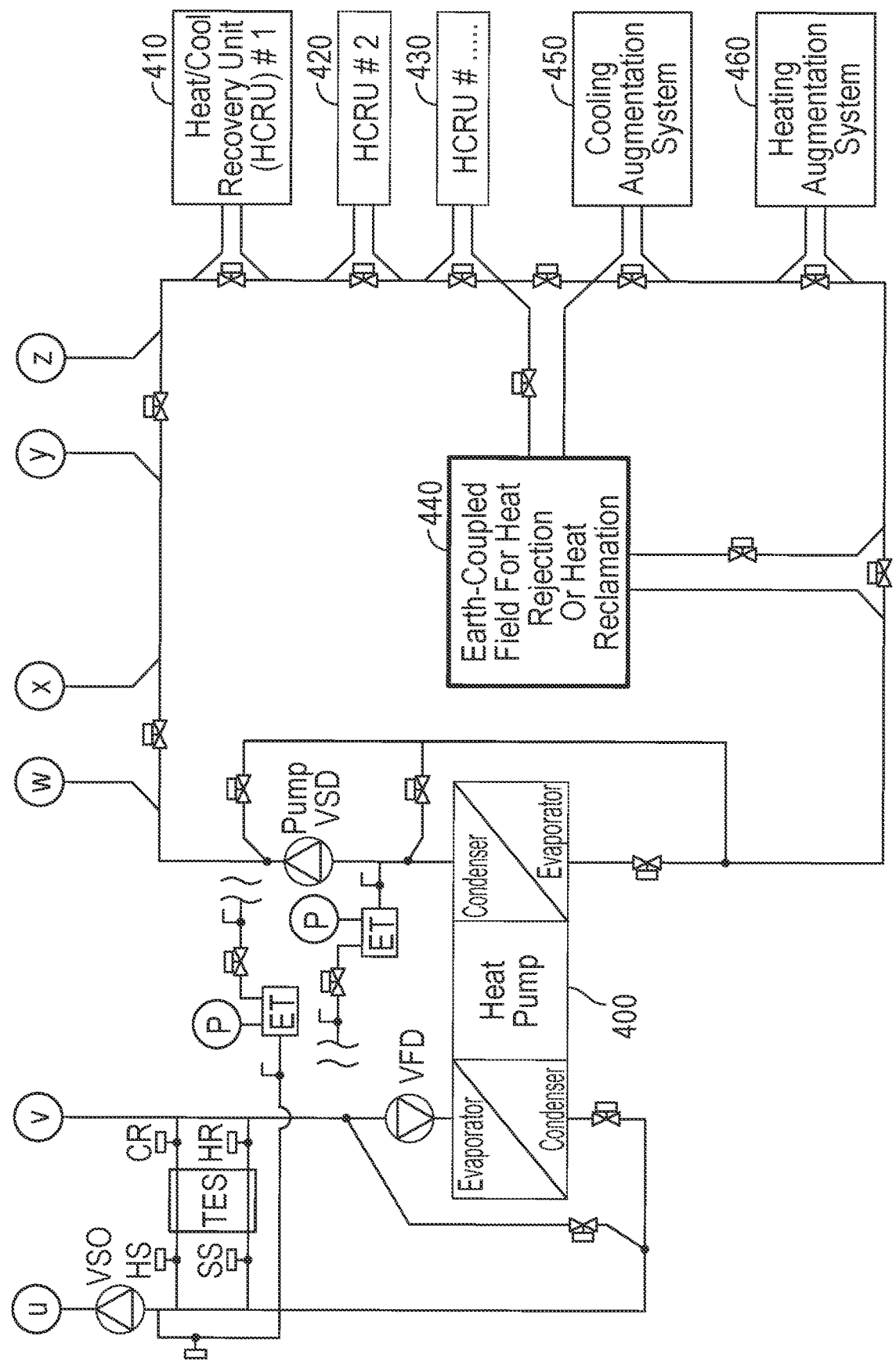
Figure 5A:
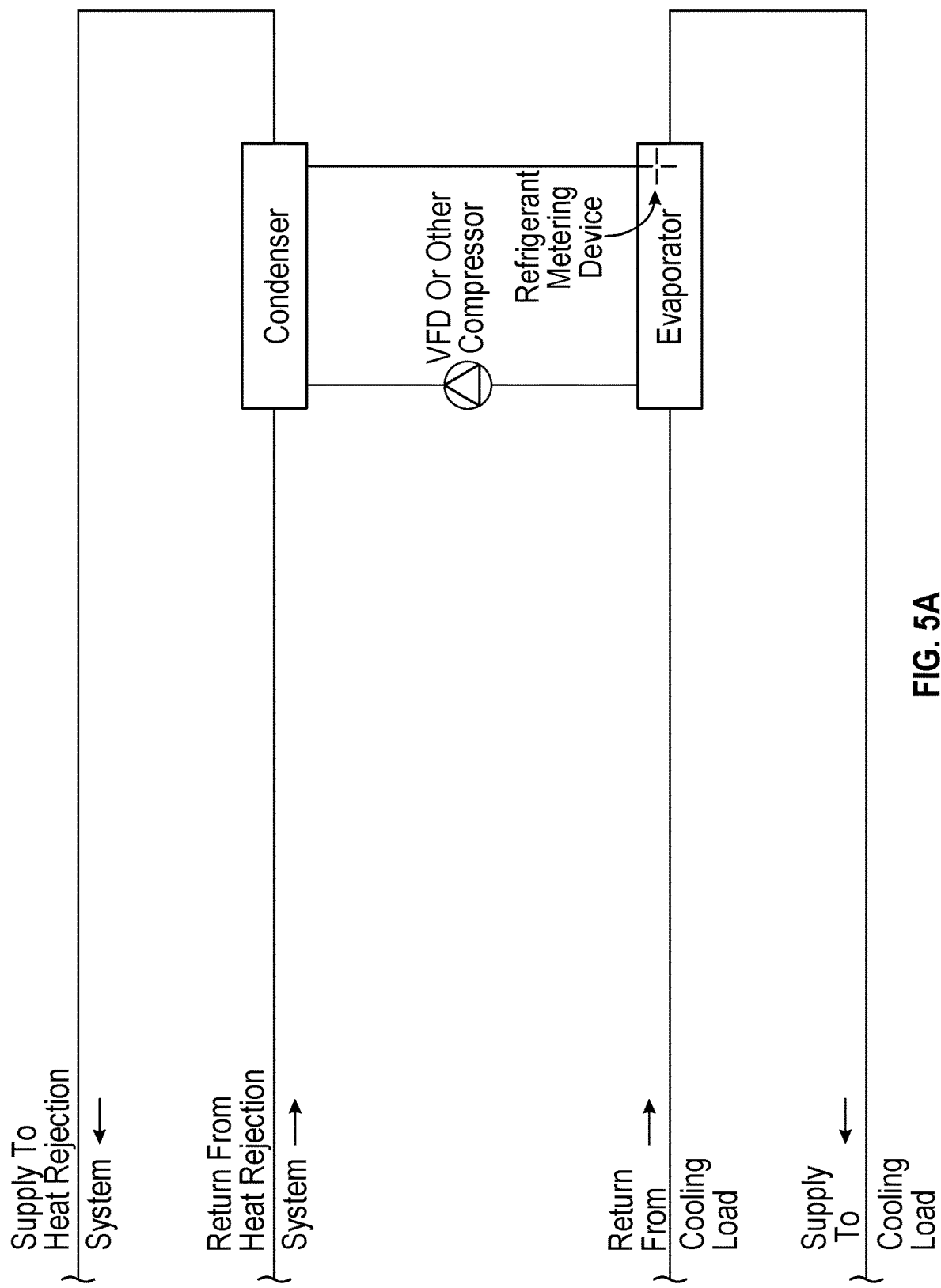
Figure 5B:
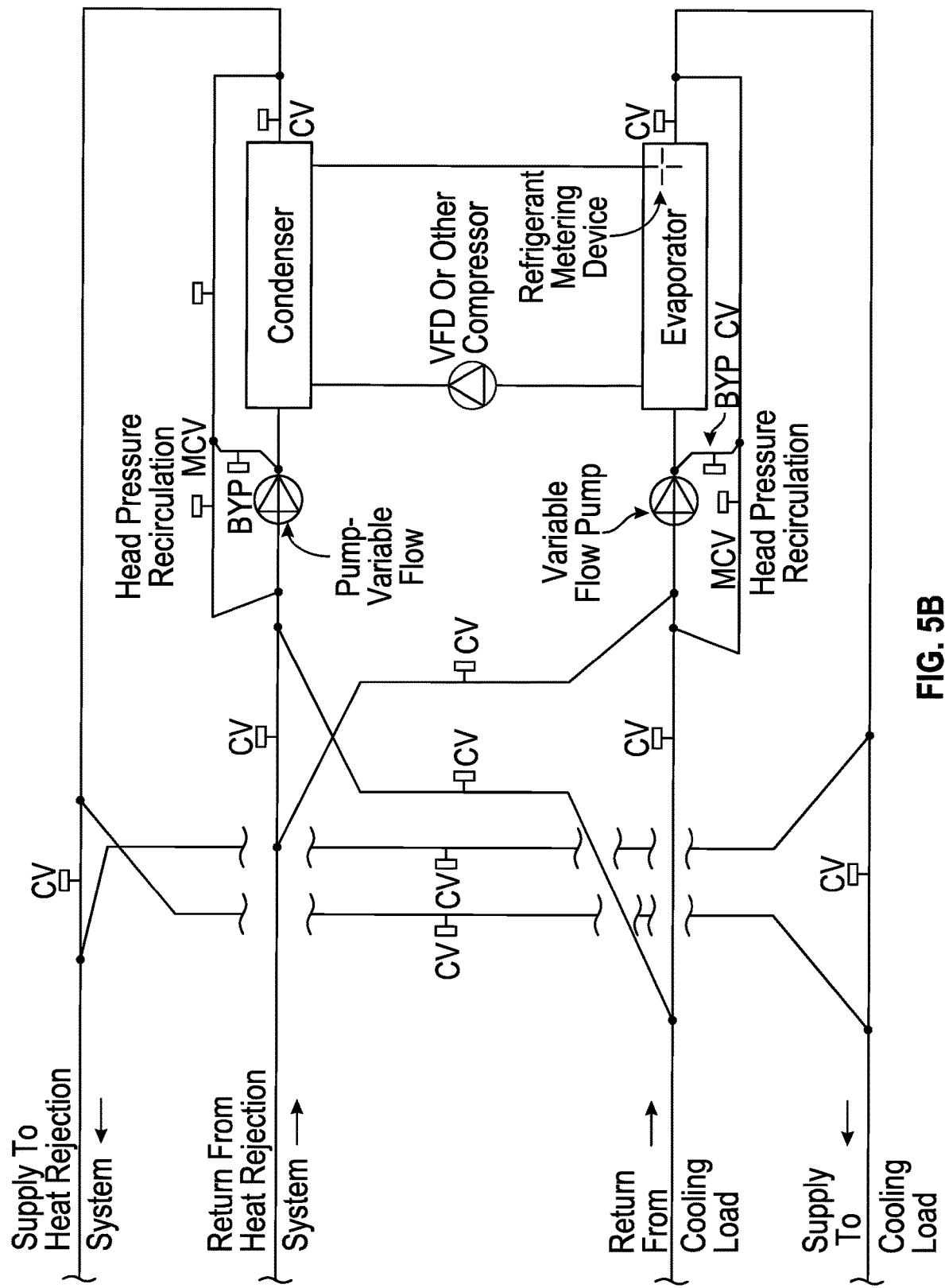

Heating and cooling load-side Thermal Energy Storage (TES) allows smaller systems to be utilized, or undersized systems to begin to serve their loads, or compressor systems to be utilized when renewable energy or less expensive energy is available and then shut down to utilize the stored thermal energy when renewable capacity is reduced, or when utility costs are higher. The load side design is unique, in that the TES tank can be utilized for heat energy storage as well as cooling energy storage with a very simple valve system and control strategy. One strategy is shown in FIG. 4B, other strategies that may utilize different pumping and valve arrangements can be utilized as well. The load side TES system can be charged with heating or cooling energy via the compressor system, or when weather conditions are favorable, the HCRU equipment 410, 420, and 430 and the cooling and heating augmentation systems 450 and 460 connected via the ground loop piping system may be able to provide capacity in an efficient manner. Stored energy that may be directly available from the earth field (without operating the compressors) can also be used to charge the load side TES systems.

These implementations significantly decrease the cooling and dehumidification loads that need to have heat rejected into the earth, and allow much colder heating water temperatures to be used to keep facilities warm or process loads met. Thus the effective capacity of the earth to work with the HVAC systems is greatly enhanced. The combined systems can greatly increase the applicability, effectiveness, efficiency, and site availability for ground-sourced, or earth-sourced heat pump systems (sometimes referred to as geothermal heat pumps, geo-exchange heat pumps, or earth-coupled heat pump systems).

The equipment sizing, design, and control strategies allow the use of the cooling energy stored in the earth during the heating season, or the cooling augmentation system 450, or the HCRU's 410, 420, and 430 to be used directly to provide cooling to the cooling coils (CC) 118, without running the compressor for a significant number of hours each year. The ERHEDS CC 118 sizing is such that the "cold" water temperatures can be very high while still providing enough cooling energy to keep the facility cool. During the spring, in many locations, it is likely that the compressor will not be run until the humidity levels get too high, or the water temperature available from the earth-source or provided by the cooling augmentation system 450 or the HCRU's 410, 420, and 430 is just below the desired dewpoint temperature. With this subject matter, compressor run time can be minimized, extending equipment life and reducing energy waste. When dehumidification is needed, the cold water temperatures being withdrawn from the earth loop or provided by the cooling augmentation system 450, or the HCRU's 410, 420, and 430 can be as close as 2° F. to the desired dewpoint temperature of the air being supplied by the unit. Even as the cooling source energy is warmed up, there may be many hours a day when the cooling and/or cooling/dehumidification loads can be met with direct earth-sourced cooling or provided by the cooling augmentation system 450, or the HCRU's 410, 420, and 430, rather than compressor-augmented earth-sourced cooling.

Similarly, during the fall, when heating loads may be low, and the water temperatures available from the earth-sourced system are the highest, it is likely that the compressor will not need to be run to create heating hot water to meet facility or process needs, heating energy can be directly sourced from the earth fields, or obtained or augmented by the HRCU's 410, 420, and 430.

There will be many hours when the cooling augmentation system 450 can be utilized to provide chilled fluid to the ERHEDS CC 118 to meet cooling needs without compressor operation, and the heating augmentation system 460 can be utilized to provide warmed fluid to the ERHEDS CC 118 to meet heating needs without compressor operation, further reducing compressor run time and extending equipment life.

If this system is combined with Underground Thermal Energy Storage (UTES), Aquifer Thermal Energy Storage (ATES), or Borehole Thermal Energy Storage (BTES), the ability to utilize earth-sourced heating and cooling energy directly to meet facility or process needs, without the need to operate the compressor(s) to augment the temperatures is enhanced even further.

The subject matter is shown to use closed loop systems on both sides of the heat pump. With appropriate equipment and filtration, open loop can be utilized, where allowed, for the earth-sourced side of the system.

The subject matter allows simultaneous heating and cooling using 100% recovered energy, for any or all loads connected to the system. Some loads may be in heating only, some may be cooling only, and some may be in cooling/dehumidification/reheat. Cooling and heating energy can be stored in the earth even when the compressor(s) are not running.

The diagrams depict multiple piping and equipment configurations that allow a multitude of different operating strategies and enhanced efficiency, capacity, and energy storage to occur.

Implementations described herein can unload effectively and reliably down to 0% (zero percent) cooling load while providing the desired supply air dry bulb and dewpoint temperatures required to meet internal temperature, dewpoint and relative humidity conditions, where other systems cannot perform these duties. This is required to help prevent biological growth from occurring.

With the proposed subject matter, reduced refrigerant pressures in the condenser result, as the heat is rejected to create the false load, which lowers the fluid temperature of the return stream that is used to cool the refrigerant in the condenser. Removing heat from the heat rejection system via the preheat coil and/or reheat coil to false load the compressor or control temperatures or RH reduces the refrigerant pressure in the condenser, improving energy efficiency and capacity.

These implementations are unique in that by using heat rejected from the compressor system via the preheat and reheat coils, or by direct injection into the plant to false load the compressor, the condenser cooling liquid temperature can be reduced in a meaningful manner. This allows the head pressure (condenser side refrigerant pressure) to be reduced with essentially zero energy expended, improving compressor and system capacity and efficiency.

A sample situation follows: Assume that the ambient conditions are >55° F. and <60° F. and it is foggy or high humidity outside. The facility would typically be in the heating mode of operation, but if heating is provided without cooling and dehumidifying the air, the indoor conditions will have unacceptably high relative humidity, especially if the spaces are only heated to 68° F. as is the case with many facilities. To solve this problem, the fresh air being brought into the building needs to be sub-cooled down to 55° F. or lower and then reheated to some degree for most buildings to maintain the desired indoor RH levels. The cooling load of the fresh air being brought into the building is very small, too small for cooling systems to reliably serve, so the compressor serving that cooling load will cycle on and off. Every time the compressor cycles on, the cooling capacity is too high, even with Hot Gas ByPass (HGBP) or other false-loading technologies, so the air is overcooled, and the coil fin pack is loaded with a significant amount of condensed moisture. Because the supply air temperature is too low, the compressor cycles back off, in short order. Now, when the compressor cycles off, the near 100% RH fresh air being brought into the building is untreated, and in fact may be re-evaporating the moisture that is being held in the coil fin pack, so RH control of the spaces is lost. When this situation occurs with various implementations of these systems, those very low loads can be met and controlled successfully. To ensure that the compressor does not cycle on and off and create RH and temperature control issues, load, in the form of rejected heat energy from the condenser side of the system, would be injected either upstream from the cooling coil in the preheat coil (PHC) to warm up the air entering the CC, or, in the absence of the need for a preheat coil, heat would be injected into the chilled fluid loop, to add load directly to the system. The controls would be enabled to keep the compressor operational with minimal to zero on/off cycling. If this situation occurs when there is fluid available from the earth loop or the HCRU's 410, 420, and 430 or the cooling augmentation system 450 at a low enough temperature, the compressor would not be enabled at all, and the loads would be met directly through the use of the various piping, valve and pumping arrangements that interconnect the two sides of the system.

Multiple Heating/Cooling Recovery Units (HCRU) are shown. These devices are unique in that they can either recover heating or cooling energy from the piping loop to serve another load, or they can inject heating or cooling energy into the piping loop from other sources.

In some embodiments, the source of some or all of the cooling and heating energy could be the domestic water system.

The system piping connections for the PHC and RHC could also be reversed if it is desired to have a higher quality heat available for the RHC to heat the air up to a higher temperature and to lower the RH of the air leaving the unit even further.

The ground coupled field 440 is shown to be connected into the piping loop in two different locations, although additional locations can be included as needed to meet the needs of the system. The two piping systems that are shown allow the capacity of the ground coupled field 440 to be augmented and utilized in novel ways. During cooling/dehumidification season heat rejection to the ground, the heating energy going into the ground can either be decreased by rejecting heat to the atmosphere via the cooling augmentation system 450, or it can be increased by adding heat from another source, potentially renewable or reclaimed from another waste heat source.

During the winter, or heating season, added cooling energy can be obtained to augment the cooling earth source for the following cooling season. The earth-coupled field piping connections upstream from the augmentation systems can be used when the heat sink (or source) does not have enough instantaneous capacity and needs to be augmented to meet current needs. The downstream piping POC can be used when it is desired to augment the capacity of the heat sink (source) for the following season (or day).

Another unique part of the subject matter is two sets of valves that provide two functions. During the cooling season, especially at the start of the cooling season, on the earth-loop side of the piping system, there may be fluid being delivered from the earth loop into the condenser side of the system that is too cold to allow proper operation of the compressor system—the refrigerant pressure could be too low to allow proper refrigerant flow volumes and orifice/expansion valve operation to occur, so the system may fault and fail on a frequent basis. The earth loop pumping system will typically be variable flow, and to control refrigerant head pressure when excessively cold fluid is available, the pump speed will be modulated to its minimum flow setpoint. If the minimum flow from the earth loop is still too high, and the condensing pressure is too low, the pump flow rate would need to be reduced further, but the condenser heat exchangers have a minimum required flow rate through them. One of the valves performs two functions simultaneously, and is modulated to control both head pressure and minimum flow rate through the condenser heat exchanger system.

Another set of valves is utilized to completely bypass the condenser side (described for the cooling mode) of the heat pump, when there is the ability to utilize the cooling or heating energy stored in the earth loop, or available from the HCRU's 410, 420, and 430 or heating or cooling augmentation systems 460 and 450 without the compressor being operated.

On the evaporator side of the heat pump (load side during the cooling mode) there is a similar set of valves that allows the evaporator to be completely bypassed to allow cooling or heating energy to be distributed on the load side of the system without the need to operate the compressor(s), or experience the pressure drop through the heat exchanger, as well as providing fluid recirculation from the leaving side of the evaporator to the entering side of the evaporator for both temperature control and flow control. Especially at the start of the heating season, the fluid temperature leaving the earth-source may be too high for proper compressor/chiller/heat pump operation. If the fluid temperature into the chiller is too high, these valves will be controlled in a manner to recirculate cold leaving water into the warm to hot entering water to reduce the water temperature into the chiller.

With this and other hydraulic diagrams, pressure relief valves are not shown, but are required to any section of piping or equipment that can be isolated between two valves without direct hydraulic access to an expansion tank.

Figure 6:
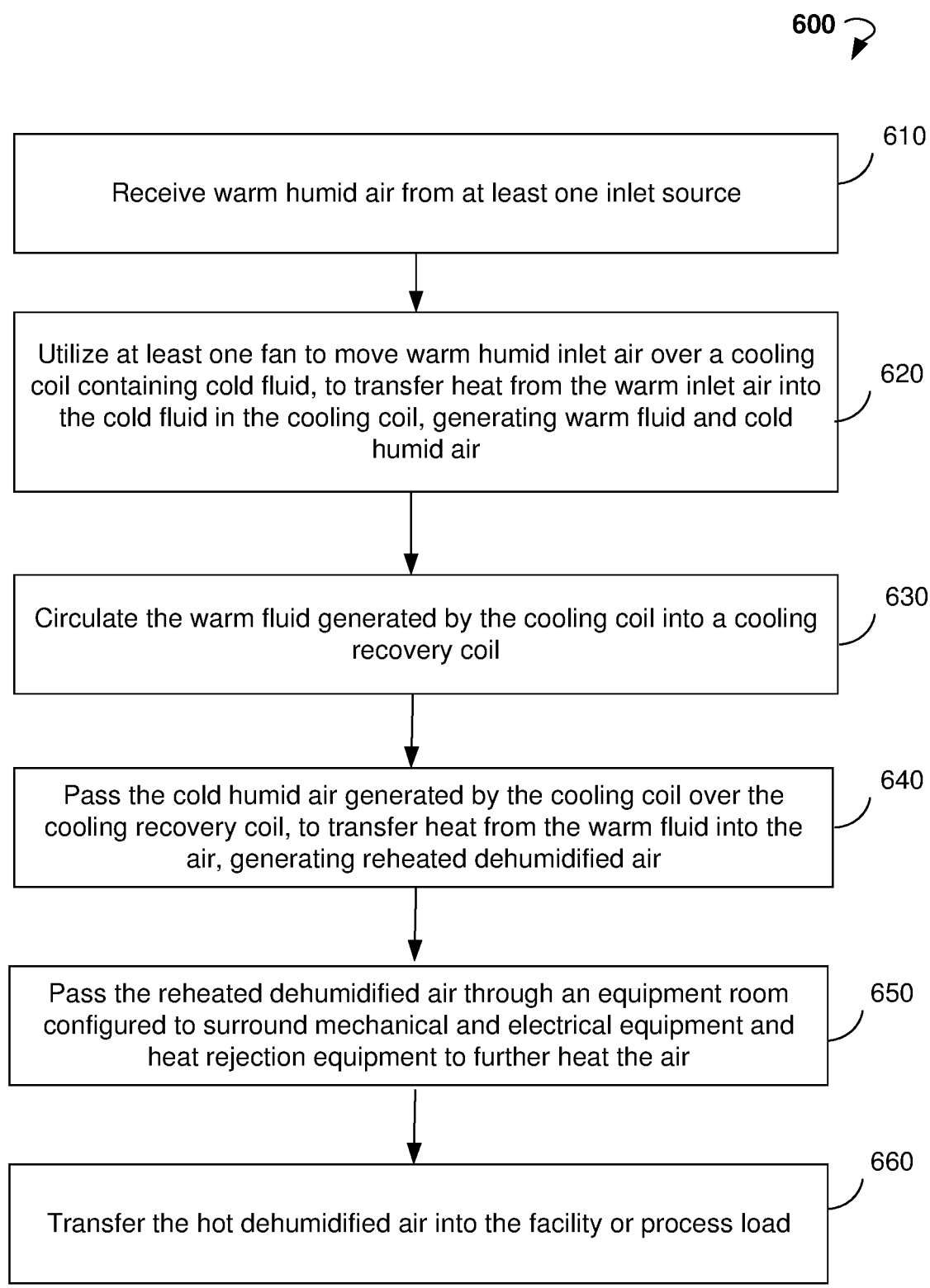
FIG. 6 illustrates an exemplary method for practicing embodiments of the present disclosure.

FIG. 6 illustrates an exemplary method 600 for practicing embodiments of the present disclosure discussed herein. In step 610, warm humid air is received from at least one inlet source. The inlet air source can be either 100% from an outside environment, a combination of outside air mixed with air from a facility, or 100% air from a facility.

In step 620, at least one supply fan is utilized to pass the inlet air over a cooling coil containing cold fluid. The cooling coil has heat transfer fins, such that when the air passes over it, heat is transferred from the inlet air (that is warm and has a high RH) into the fluid of the cooling coil. Thus, the fluid in the cooling coil is heated and the air is cooled at substantially 100% RH.

In step 630, the warm fluid generated from the cooling coil is circulated into a cooling recovery coil. In step 640, the cooled humid air generated from the cooling coil is passed over the cooling recovery coil to transfer heat from the fluid back into the air. By heating the air, the relative humidity of the air decreases, even though the total moisture content may remain constant. Thus, the reheated air leaving the cooling recovery coil is dehumidified.

In step 650, the reheated dehumidified air is passed through an equipment room configured to surround mechanical and electrical equipment. The heat emitted from the mechanical and electrical equipment further heats the air passing through producing hot dehumidified air.

In step 660, the reheated dehumidified is circulated into the facility or process load where dehumidification is being conducted. By transferring dehumidified air back into the facility, condensation and thus mold growth is prevented from occurring on surfaces within the facility. Transferring cold air into a facility causes the moisture in the air to condense when it touches surfaces at room temperature in the facility, which in turn causes mold growth.

Figure 7:
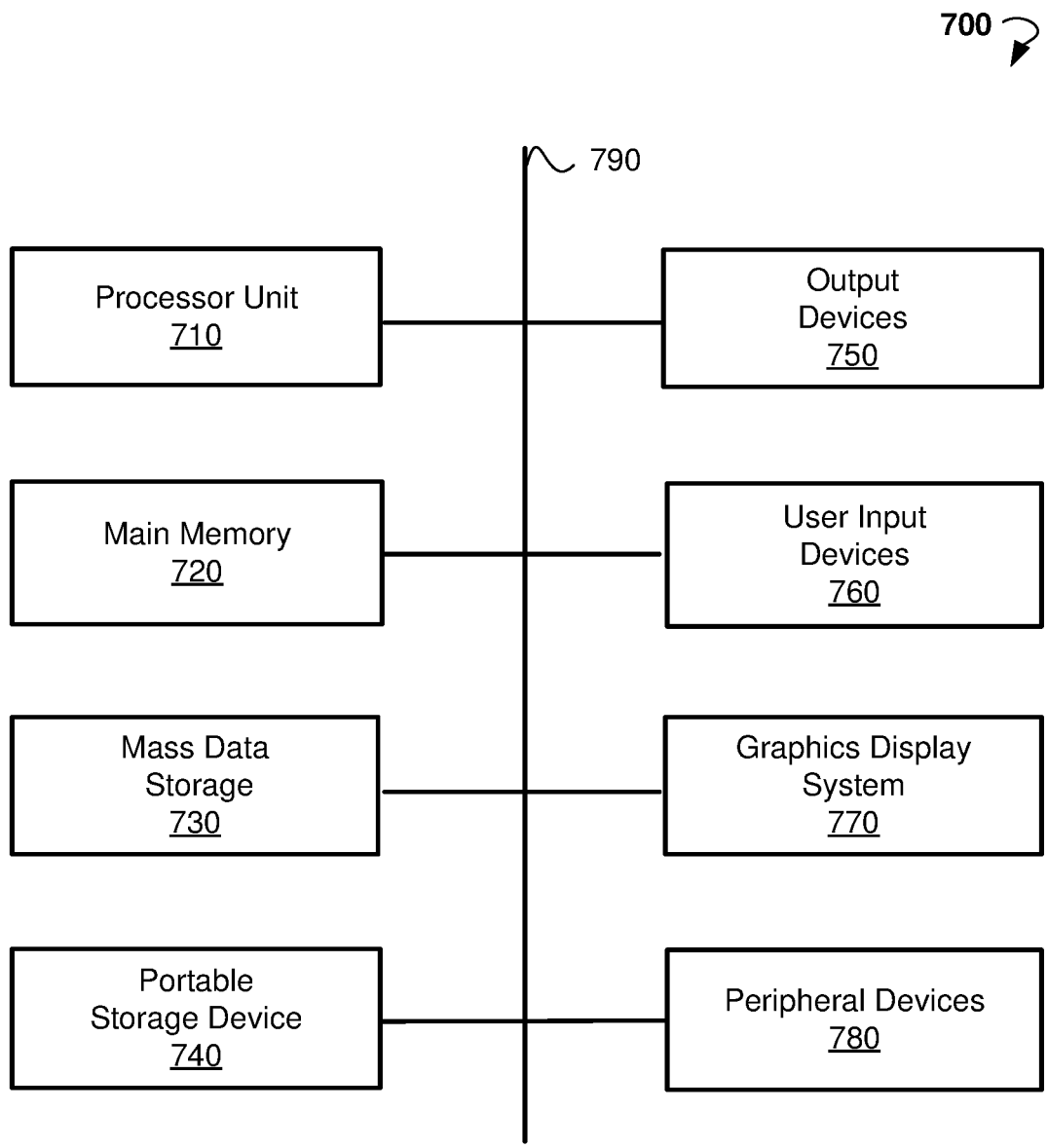
FIG. 7 illustrates a diagrammatic representation of an example machine in the form of a computing system within which a set of instructions for causing the machine to perform any one or more of the methodologies discussed herein is executed.

FIG. 7 illustrates an exemplary computer system 700 that may be used to implement various software processes according to embodiments of the present disclosure. The computer system 700 can be implemented to switch (for example, automatically switch) between the system that provides hot air or hot dehumidified air to the facility, and the system that provides cool, dehumidified, and/or reheated air to the facility. The computer system 700 can automatically switch between systems by for, example, opening and/or closing certain dampers, as described above. In some implementations, the computer system 700 can adjust (for example, automatically adjust), certain variables, such as fan speed, water temperature, air temperature, and/or the like. The computer system 700 of FIG. 7 may be implemented in the contexts of the likes of computing systems, networks, servers, or combinations thereof. The computer system 700 of FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 of FIG. 7 further includes a mass data storage 730, portable storage device 740, output devices 750, user input devices 760, a graphics display system 770, and peripheral devices 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral devices 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage mediums (such as a flash drive, compact disk, digital video disc, or USB storage device, to name a few) to input and output data/code to and from the computer system 700 of FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones; an alphanumeric keypad, such as a keyboard, for inputting alphanumeric and other information; or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and process the information for output to the display device.

Peripheral devices 780 may include any type of computer support device to add additional functionality to the computer system.

The components provided in the computer system 700 may be suitable for use with embodiments of the present disclosure. The computer system 700 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 700 is implemented as a cloud-based computing environment. In other embodiments, the computer system 700 may itself include a cloud-based computing environment. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users).

The description of the present subject matter has been presented for purposes of illustration and description, but is not intended to be exhaustive or limited to the present subject matter in the form disclosed. Many modifications and variations will be apparent to those of ordinary skill in the art without departing from the scope and spirit of the present subject matter. Exemplary embodiments were chosen and described in order to best explain the principles of the present subject matter and its practical application, and to enable others of ordinary skill in the art to understand the present subject matter for various embodiments with various modifications as are suited to the particular use contemplated.

In the description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An energy recovery high efficiency dehumidification system for providing hot air or hot dehumidified air to a facility, the system comprising:
   an air filter bank that receives air from a first inlet source;
   a supply fan that causes the air to flow from the first inlet source;
   a cooling coil configured to cool and reduce a relative humidity of the air that passes over the cooling coil;
   a cooling recovery coil coupled with the cooling coil and configured to heat the cooled air to generate cooled dehumidified reheated air in a cooling recovery coil plenum;
   an equipment room configured to surround mechanical and electrical equipment and receive the cooled dehumidified reheated air from the cooling recovery coil plenum, wherein the cooled dehumidified reheated air is configured to be further heated, the equipment room including control panels, pump variable frequency drives, pumps, chiller and/or a heat rejection coil and associated fans for a chiller condenser side;
   the heat rejection coil rejecting heat recovered from one or more components of the mechanical and electrical equipment to cause a temperature of the further heated cooled dehumidified reheated air to increase, the air configured to pass through an outlet to the facility; and
   wherein 100% of an electrical energy that is used to provide cooling and dehumidification is recaptured and used to reheat the cooled dehumidified reheated air.

2. The system of claim 1, wherein the cooling recovery coil plenum includes a first damper system and a second damper system, the first damper system connecting ductwork to the cooling recovery coil plenum being in a closed position and the second damper system connecting the equipment room to the cooling recovery coil plenum being in an opened position.

3. The system of claim 2, wherein the equipment room includes a third damper system connecting a second inlet source, the third damper system being in a closed position to redirect air to the heat rejection coil.

4. The system of claim 1, wherein the system further comprises a preheat coil for receiving a preheating liquid from one or more heat recovery units to preheat air from the first inlet source that passes over the preheat coil.

5. The system of claim 1, wherein the system further comprises a reheat coil to further heat the cooled dehumidified reheated air received from the cooling recovery coil.

6. The system of claim 1, wherein the system further comprises a chemical or biological mitigation system configured to disable and reduce growth of biological material on the cooling coil.

7. The system of claim 6, wherein the chemical or biological mitigation system comprises one or more of an Ultra Violet Germicidal Irradiation (UVGI) system or a Photocatalytic Oxidation (PCO) system.

8. The system of claim 1, wherein at least a portion of a fluid provided to the cooling coil to cool and reduce the relative humidity of the air is output from the cooling coil and provided to an inlet of the cooling recovery coil to reheat the cooled air.

9. A method for providing hot air or hot dehumidified air to a facility using an energy recovery high efficiency dehumidification system, the method comprising:
   receiving air, by an air filter bank, from a first inlet source;
   causing the air to flow, by a supply fan, from the first inlet source;
   cooling and reducing, by a cooling coil, a relative humidity of the air that passes over the cooling coil;
   heating the cooled air, by a cooling recovery coil coupled with the cooling coil, to generate cooled dehumidified reheated air in a cooling recovery coil plenum;
   receiving, by an equipment room configured to surround mechanical and electrical equipment, the cooled dehumidified reheated air from the cooling recovery coil plenum, wherein the cooled dehumidified reheated air is configured to be further heated, the equipment room including control panels, pump variable frequency drives, pumps, chiller and/or a heat rejection coil and associated fans for a chiller condenser side;

rejecting heat recovered from one or more components of the mechanical and electrical equipment, by the heat rejection coil, to cause a temperature of the further heated cooled dehumidified reheated air to increase, the air configured to pass through an outlet to the facility; and wherein 100% of an electrical energy that is used to provide cooling and dehumidification is recaptured and used to reheat the cooled dehumidified reheated air.

10. The method of claim 9, wherein the cooling recovery coil plenum includes a first damper system and a second damper system, the first damper system connecting ductwork to the cooling recovery coil plenum being in a closed position and the second damper system connecting the equipment room to the cooling recovery coil plenum being in an opened position.

11. The method of claim 10, wherein the equipment room includes a third damper system connecting a second inlet source, the third damper system being in a closed position to redirect air to the heat rejection coil.

12. The method of claim 11, wherein 100% of the electrical energy that is used to provide cooling and dehumidification is recaptured and used to reheat the cooled dehumidified reheated air.

13. The method of claim 9, further comprising receiving, by a preheat coil, a preheating liquid from one or more heat recovery units to preheat air from the first inlet source that passes over the preheat coil.

14. The method of claim 9, further comprising further heating, by a reheat coil, the cooled dehumidified reheated air received from the cooling recovery coil.

15. The method of claim 9, further comprising disabling and reducing growth of biological material on the cooling coil by a chemical or biological mitigation system.

16. The method of claim 15, wherein the chemical or biological mitigation system comprises one or more of an Ultra Violet Germicidal Irradiation (UVGI) system or a Photocatalytic Oxidation (PCO) system.

* * * * *